US011863302B2

(12) United States Patent
Freda et al.

(10) Patent No.: US 11,863,302 B2
(45) Date of Patent: Jan. 2, 2024

(54) MEDIUM ACCESS PROTOCOL DATA UNIT ASSEMBLY IN WIRELESS SYSTEMS

(71) Applicant: InterDigital Patent Holdings, Inc., Wilmington, DE (US)

(72) Inventors: Martino M. Freda, Laval (CA); Paul Marinier, Brossard (CA); Ghyslain Pelletier, Montreal (CA); Benoit Pelletier, Roxboro (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/104,832

(22) Filed: Feb. 2, 2023

(65) Prior Publication Data

US 2023/0188269 A1 Jun. 15, 2023

Related U.S. Application Data

(63) Continuation of application No. 16/096,489, filed as application No. PCT/US2017/031941 on May 10, 2017, now Pat. No. 11,601,224.

(Continued)

(51) Int. Cl.
*H04L 1/1812* (2023.01)
*H04L 5/00* (2006.01)
(Continued)

(52) U.S. Cl.
CPC .......... *H04L 1/1819* (2013.01); *H04L 1/0003* (2013.01); *H04L 5/0053* (2013.01);
(Continued)

(58) Field of Classification Search
None
See application file for complete search history.

(56) References Cited

U.S. PATENT DOCUMENTS 8,611,277 B2 12/2013 Krishnamurthy et al.
9,357,541 B2 5/2016 Moulsley et al.
(Continued)

FOREIGN PATENT DOCUMENTS

CN 101801090 A 8/2010
CN 102550105 A 7/2012
(Continued)

OTHER PUBLICATIONS

Author Unknown, Frame structure design of new RAT, Doc. No. R1-162228, pp. 3-6, Apr. 15, 2016.*
(Continued)

*Primary Examiner* — Christopher M Crutchfield
(74) *Attorney, Agent, or Firm* — Flater Greenberg, P.C.

(57) ABSTRACT

Systems, methods, and instrumentalities (e.g. aspects of entities, interfaces and procedures in a wireless transmit/receive unit (WTRU) and/or network layers L1, L2, l3) are disclosed for low latency medium access control (MAC) protocol data unit (PDU) assembly in wireless systems, such as 5G flexible radio access technology (RAT) (5gFLEX). Latency may be reduced, for example, by WTRU determination of network transmission parameters and signaling prior to a transmission grant. A WTRU may receive a modulation and coding scheme (MCS), resource range, etc. prior to a grant, e.g., for use in future grants. Data blocks may be incrementally created/encoded prior to a grant. Data units may be segmented, assembled and multiplexed, for example, based on data block sizes that allow MAC and radio link control (RLC) processing prior to a grant. Flexible grant sizes may be provided for early generation of transport blocks before a grant. A minimum guaranteed transport block size (TBS) may be signaled to permit early generation of a MAC PDU. Transmission parameters may be selected
(Continued)

prior to a grant, for example, using blind decoding or a DCI reception procedure.

20 Claims, 9 Drawing Sheets

Related U.S. Application Data

(60) Provisional application No. 62/334,529, filed on May 11, 2016.

(51) Int. Cl.
| | |
|---|---|
| *H04W 72/23* | (2023.01) |
| *H04L 1/00* | (2006.01) |
| *H04W 72/0446* | (2023.01) |
| *H04W 72/0453* | (2023.01) |
| *H04W 80/02* | (2009.01) |

(52) U.S. Cl.
CPC .......... *H04L 5/0055* (2013.01); *H04L 5/0091* (2013.01); *H04W 72/0446* (2013.01); *H04W 72/0453* (2013.01); *H04W 72/23* (2023.01); *H04W 80/02* (2013.01)

(56) References Cited

U.S. PATENT DOCUMENTS

| | | | |
|---|---|---|---|
| 9,596,052 B2 | 3/2017 | Pan et al. | |
| 11,601,224 B2* | 3/2023 | Freda ................ | H04W 72/0453 |
| 2012/0113845 A1 | 5/2012 | Kim et al. | |
| 2012/0176884 A1 | 7/2012 | Zhang et al. | |
| 2013/0102342 A1 | 4/2013 | Tesanovic et al. | |
| 2014/0056278 A1 | 2/2014 | Marinier et al. | |
| 2014/0219202 A1 | 8/2014 | Kim et al. | |
| 2015/0023269 A1* | 1/2015 | Lee ....................... | H04L 1/1822 |
| | | | 370/329 |
| 2015/0063252 A1 | 3/2015 | Zhang et al. | |
| 2015/0156753 A1* | 6/2015 | Shan ................ | H04W 72/0466 |
| | | | 370/335 |
| 2015/0305056 A1 | 10/2015 | Vangala et al. | |
| 2015/0326360 A1 | 11/2015 | Malladi et al. | |
| 2016/0095089 A1 | 3/2016 | Wong et al. | |
| 2016/0212625 A1 | 7/2016 | Damnjanovic et al. | |
| 2017/0215188 A1 | 7/2017 | Kim et al. | |
| 2018/0006791 A1* | 1/2018 | Marinier ................ | H04L 1/0057 |
| 2018/0242317 A1 | 8/2018 | Marinier et al. | |
| 2018/0317254 A1 | 11/2018 | Hu et al. | |
| 2018/0343626 A1 | 11/2018 | Li et al. | |
| 2019/0036654 A1* | 1/2019 | Kim ................... | H04L 1/1812 |
| 2019/0098622 A1* | 3/2019 | Lee ....................... | H04W 72/23 |
| 2019/0123875 A1 | 4/2019 | Guan et al. | |
| 2020/0305171 A1 | 9/2020 | Van Phan et al. | |

FOREIGN PATENT DOCUMENTS

| | | |
|---|---|---|
| CN | 102687417 A | 9/2012 |
| CN | 103580788 A | 2/2014 |
| CN | 103733711 A | 4/2014 |
| CN | 105164961 A | 12/2015 |
| CN | 106686738 A | 5/2017 |
| EP | 2787670 A1 | 10/2014 |
| JP | 2014-527348 A | 10/2014 |
| KR | 2016-0041938 A | 4/2016 |
| WO | WO 2011/083431 A2 | 7/2011 |
| WO | WO 2015/164251 A1 | 10/2015 |
| WO | WO 2016/025899 A1 | 2/2016 |
| WO | WO 2016/040290 A1 | 3/2016 |
| WO | WO 2016/105570 A1 | 6/2016 |
| WO | WO 2016/123393 A1 | 8/2016 |

OTHER PUBLICATIONS

3rd Generation Partnership Project (3GPP), TS 36.300 V13.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", Mar. 2016, 295 pages.

3rd Generation Partnership Project (3GPP), TS 36.321 V12.9.0, "Technical Specification Group Radio Access Network, Evolved Universal Terrestrial Radio Access (E-UTRA), Medium Access Control (MAC) Protocol Specification (Release 12)", Mar. 2016, 77 pages.

3rd Generation Partnership Project (3GPP), TS 36.331 V12.9.0, "Technical Specification Group Radio Access Network, Evolved Universal Terrestrial Radio Access (E-UTRA), Radio Resource Control (RRC), Protocol Specification (Release 12)", Mar. 2016, 456 pages.

3rd Generation Partnership Project (3GPP), R1-156010, "NB-LTE—General L1 Concept Description", Ericsson, Alcatel-Lucent, Alcatel-Lucent Shanghai Bell, Nokia, Intel, ZTE, Samsung, 3GPP TSG-RAN WG1 #82bis, Malmo, Sweden, Oct. 5-9, 2015, pp. 1-16.

3rd Generation Partnership Project (3GPP), R1-155917, "On Reducing the Complexity of DL Control Blind Decoding", Sequans Communications, 3GPP TSG-RAN WG1 Meeting #82bis, Malmo, Sweden, Oct. 5-9, 2015, 5 pages.

3rd Generation Partnership Project (3GPP), TS 36.212 V13.1.0, "Technical Specification Group Radio Access Network, Evolved Universal Terrestrial Radio Access (E-UTRA), Multiplexing and Channel Coding (Release 13)", Mar. 2016, pp. 1-129.

3rd Generation Partnership Project (3GPP), R1-155512, "Narrowband IOT—Downlink Control/Data Channel Design", Samsung, 3GPP TSG RAN WG1 Meeting #82bis, Malmo, Sweden, Oct. 5-9, 2015, pp. 1-7.

3rd Generation Partnership Project (3GPP), TS 36.213 V13.1.0, "Technical Specification Group Radio Access Network, Evolved Universal Terrestrial Radio Access (E-UTRA), Physical Layer Procedures (Release 13)", Mar. 2016, 361 pages.

\* cited by examiner

MEDIUM ACCESS PROTOCOL DATA UNIT ASSEMBLY IN WIRELESS SYSTEMS

CROSS-REFERENCE TO RELATED APPLICATIONS

This application is a continuation of U.S. Non-Provisional application Ser. No. 16/096,489, filed Oct. 25, 2018, which is the National Stage entry under 35 U.S.C. § 371 of Patent Cooperation Treaty Application PCT/US2017/031941, filed May 10, 2017, which claims priority to and the benefit of U.S. Provisional Application Ser. No. 62/334,529, filed May 11, 2016, which is hereby incorporated by reference herein.

BACKGROUND

Mobile communications continue to evolve. A fifth generation may be referred to as 5G. A previous (legacy) generation of mobile communication may be, for example, fourth generation (4G) long term evolution (LTE).

SUMMARY

Systems, methods, and instrumentalities (e.g., aspects of entities, interfaces and procedures in a wireless transmit/receive unit (WTRU) and/or network layers L1, L2, l3) are disclosed for low latency medium access control (MAC) protocol data unit (PDU) assembly in wireless systems, such as 5G flexible radio access technology (RAT) (5gFLEX). Latency may be reduced, for example, by WTRU determination of network transmission parameters and signaling prior to a transmission grant. A WTRU may receive a modulation and coding scheme (MCS), resource range, etc. prior to a grant, e.g., for use in future grants. Data blocks may be incrementally created/encoded prior to a grant. Data units may be segmented, assembled and multiplexed, for example, based on data block sizes that allow MAC and radio link control (RLC) processing prior to a grant. Flexible grant sizes may be provided for early generation of transport blocks before a grant. A minimum guaranteed transport block size (TBS) may be signaled to permit early generation of a MAC PDU. Transmission parameters may be selected prior to a grant, for example, using blind decoding or a DCI reception procedure.

A wireless transmit/receive unit (WTRU) may include a processor configured (e.g., with executable instructions saved in memory) to perform one or more of the following: (i) monitor for downlink control information (DCI) across at least resources of a downlink control channel; (ii) identify the resources of the downlink control channel; (iii) decode at least a first DCI on the downlink control channel that comprises scheduling information for at least one data transmission that corresponds to one of a downlink transmission or an uplink transmission; (iv) determine at least one decoding parameter used to decode the first DCI; and (v) determine one or more transmission or reception parameters for the at least one data transmission based on the at least one decoding parameter used to decode the first DCI.

The at least one decoding parameter used to decode the first DCI may include one or more of a cycle redundancy check length or an aggregation level. The resources of a downlink control channel may comprise a set of physical resource blocks. The at least one decoding parameter may indicates whether the at least one data transmission is associated with one or more of high reliability data, low latency data, or best-effort data.

The WTRU processor may be configured to transmit a HARQ-ACK feedback over resources associated with the determined decoding parameter of the decoded downlink control channel indication.

The decoding may include blind decoding. The decoding parameter may include a subset of resources that were used to decode the first DCI when performing blind decoding. The subset of resources may include one or more control channel elements (CCEs) and the identity of the one or more CCEs may correspond to the at least one decoding parameter.

The at least one decoding parameter may include a robustness level associated with the first DCI. A higher robustness level for the first DCI may indicate a higher robustness level for the data transmission, and a lower robustness level for the first DCI may indicates a lower robustness level for the data transmission.

The one or more transmission or reception parameters for the at least one data transmission may include one or more of a quality of service (QoS) level associated with the at least one data transmission or a spectrum operating mode (SOM) associated with the at least one data transmission. The one or more transmission or reception parameters for the at least one data transmission may include a hybrid automatic repeat request (HARQ) feedback parameter associated with the at least one data transmission. The HARQ feedback parameter may include timing information for transmission or reception of HARQ feedback.

The WTRU processor may be configured to receive a configuration from a network entity. The configuration may indicates a mapping between the one or more decoding parameters and the one or more transmission or reception parameters for the at least one data transmission. The at least one decoding parameter may include a DCI format.

The one or more transmission or reception parameters for the data transmission may include one or more of a modulation and coding scheme (MCS), a set of physical resource blocks associated with the at least one data transmission, power information associated with the at least one data transmission, transmission timing information for the at least one data transmission, or a transmission timer interval (TTI) duration associated with the at least one data transmission.

A method of using a WTRU may include one or more of: (i) monitoring for downlink control information (DCI) across at least resources of a downlink control channel; (ii) identifying the resources of the downlink control channel; (iii) decoding at least a first DCI, on the downlink control channel, that comprises scheduling information for at least one data transmission that corresponds to one of a downlink transmission or an uplink transmission; (iv) determining at least one decoding parameter used to decode the first DCI; and (v) determining the one or more transmission or reception parameters for the at least one data transmission based on the at least one decoding parameter used to decode the first DCI.

A method of using a WTRU may include: (i) transmitting a HARQ-ACK feedback over resources associated with the determined decoding parameter of the decoded downlink control channel indication, and/or (ii) receiving a configuration from a network entity, wherein the configuration indicates a mapping between the one or more decoding parameters and the one or more transmission or reception parameters for the at least one data transmission.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
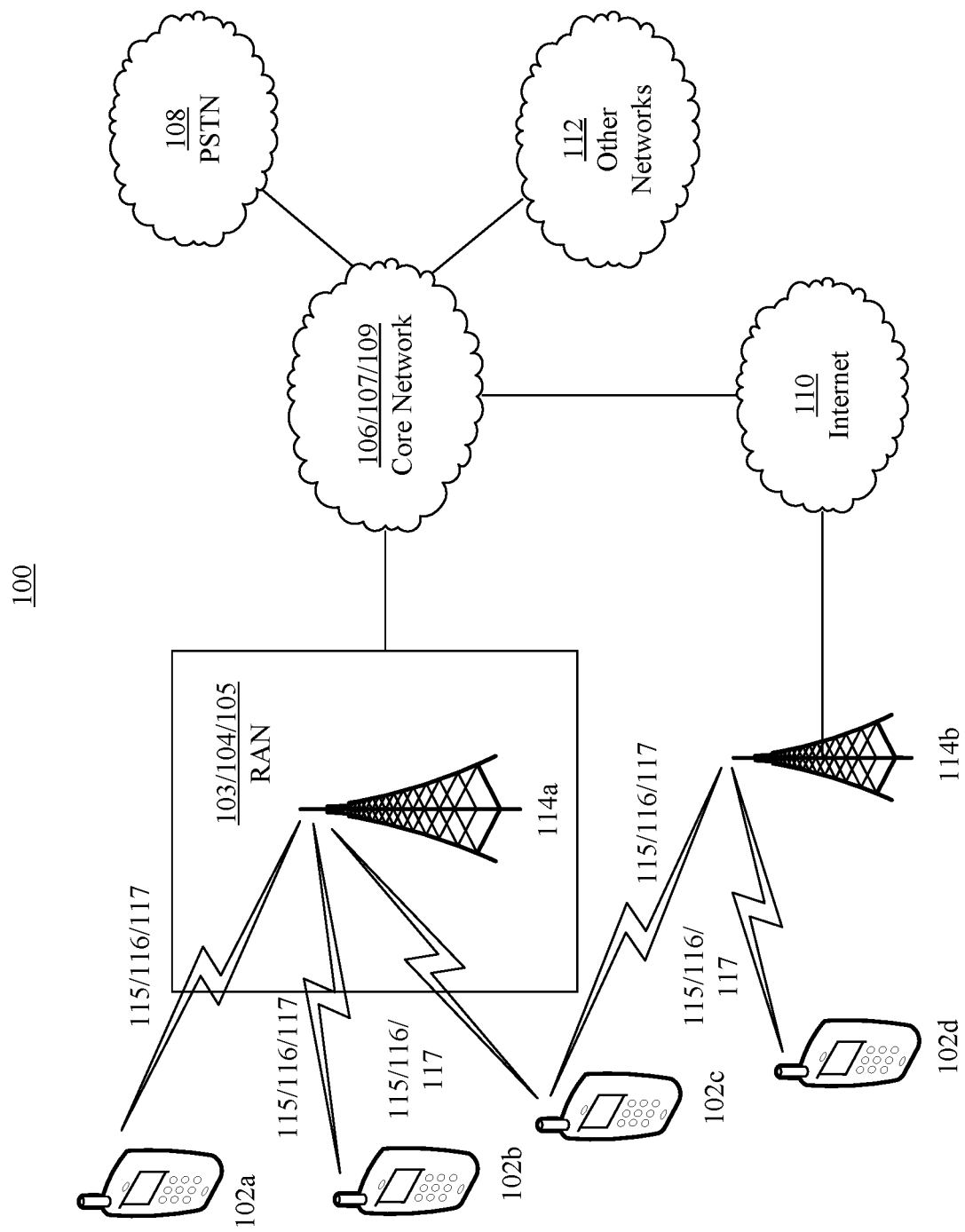
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
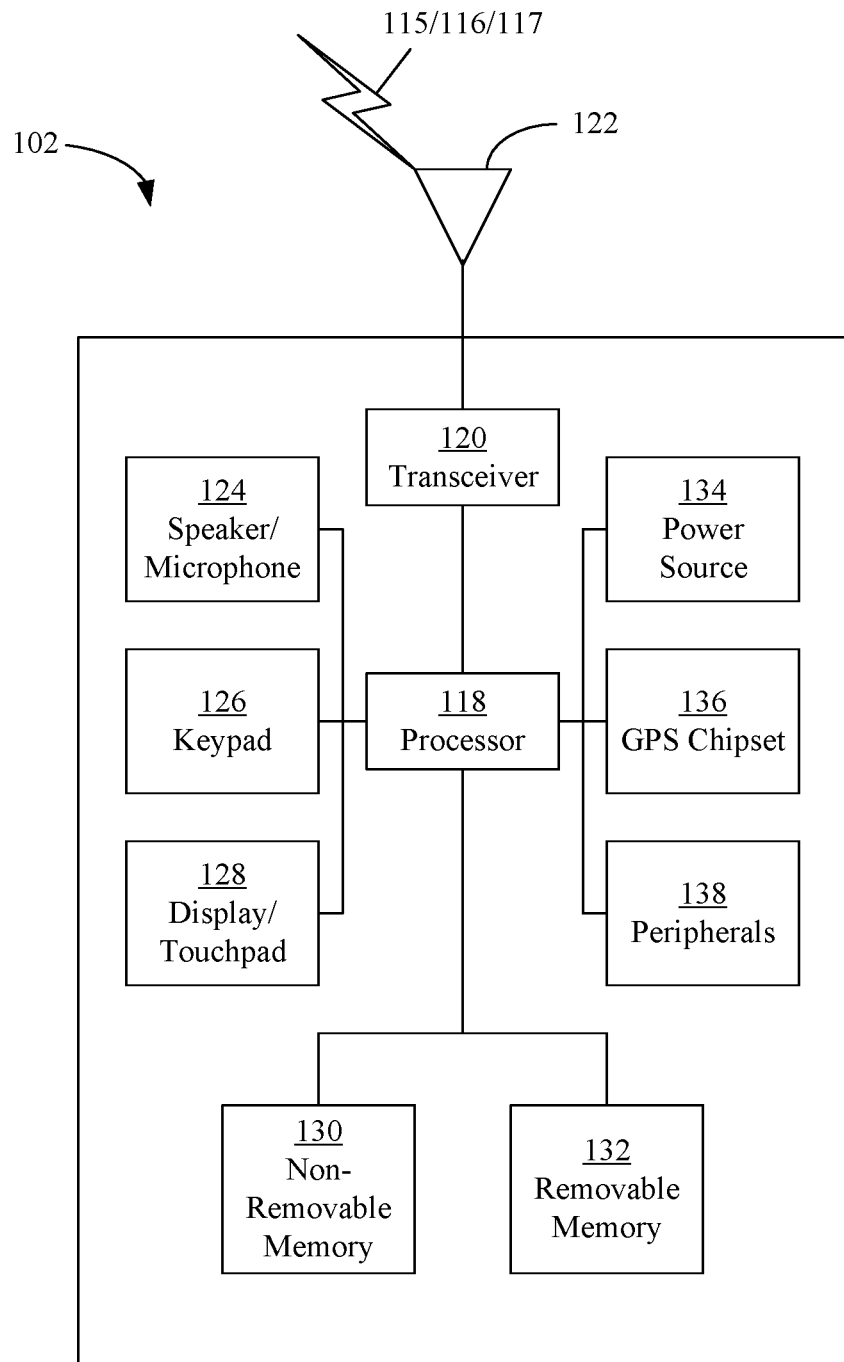
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
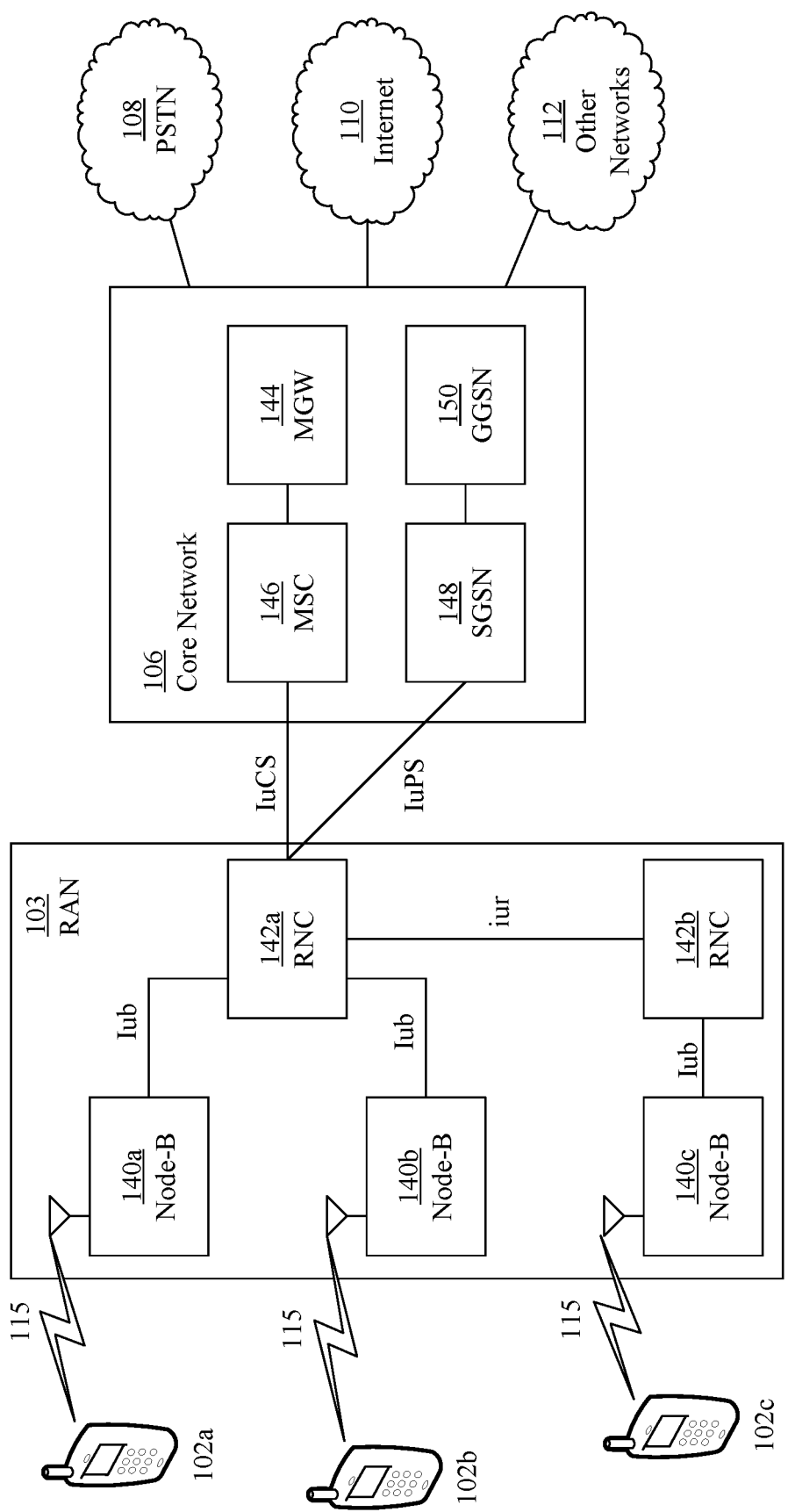
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
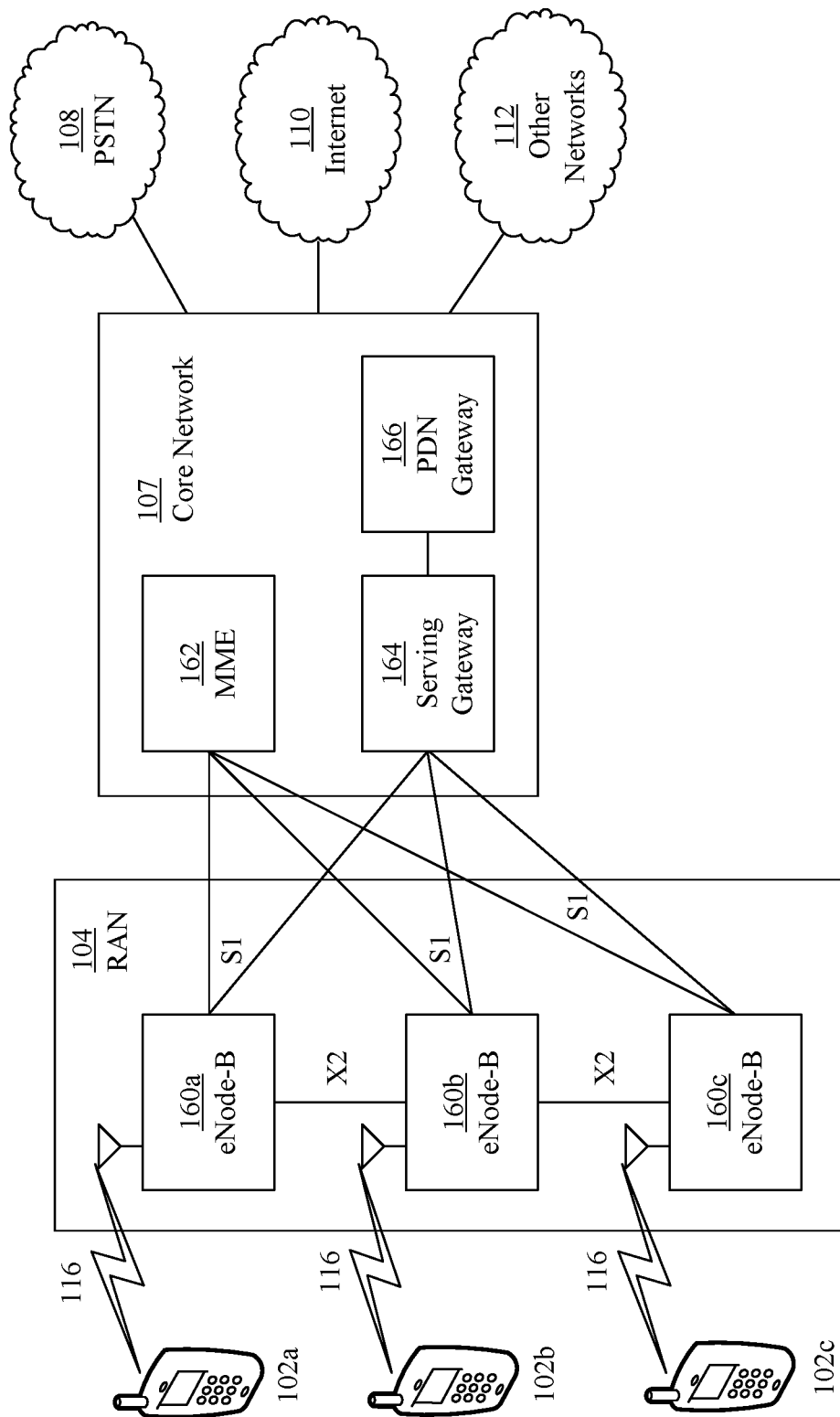
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
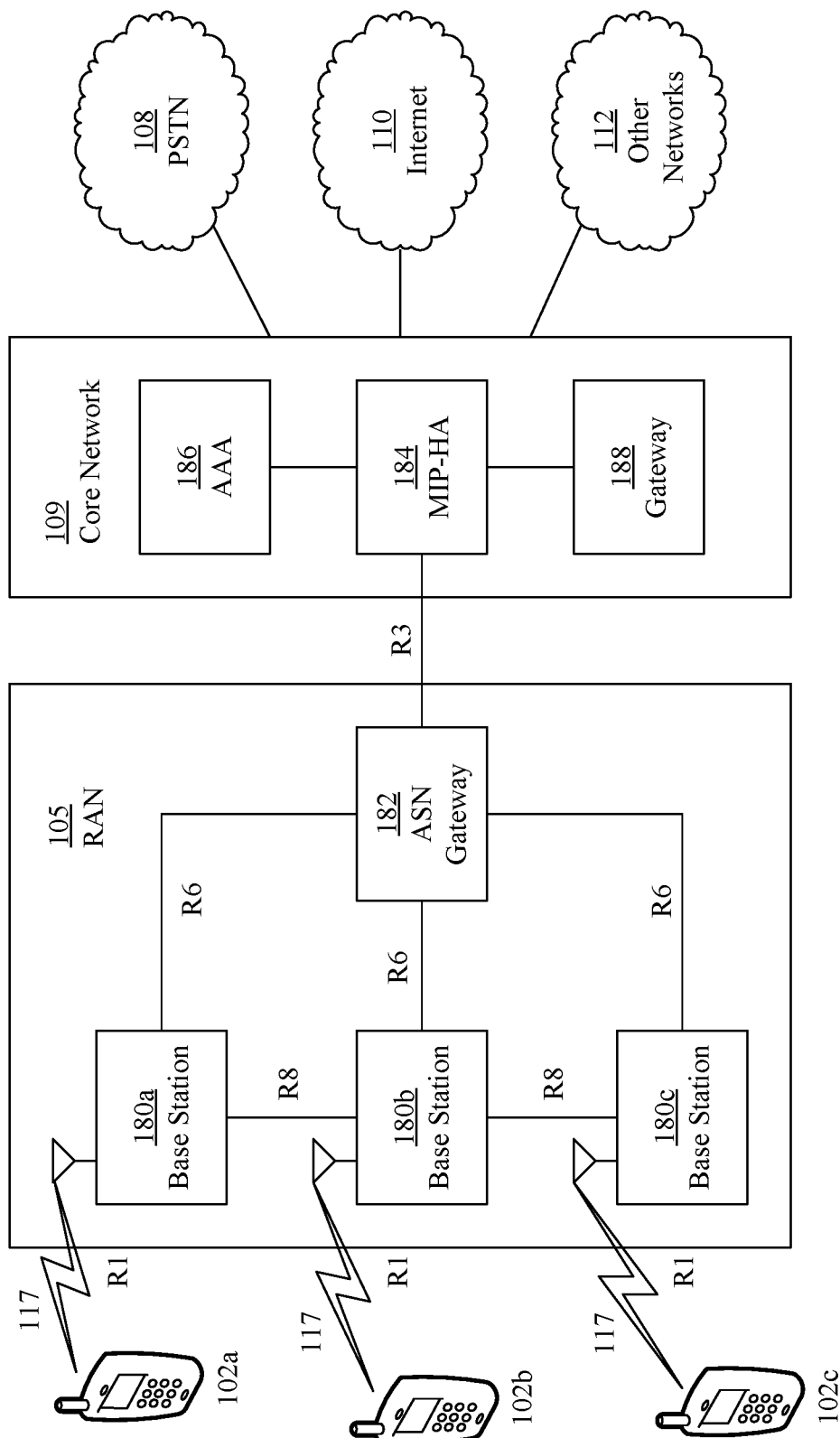
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

An air interface, e.g., for a new radio (NR) access technology in a 5G system, may support a variety of use cases, such as improved broadband performance (IBB), Industrial control and communications (ICC) and vehicular applications (V2X) and Massive Machine-Type Communications (mMTC). Use cases may have associated support in an air interface (e.g., 5G air interface).

An air interface may support, for example, ultra-low transmission latency (LLC), ultra-reliable transmission (URC) and MTC operation (including narrowband operation).

Support for ultra-low transmission latency (LLC) may comprise, for example, air interface latency such as 1 ms RTT and TTIs between 100 us to 250 us. Support may be provided for ultra-low access latency (e.g., time from initial system access until the completion of the transmission of the first user plane data unit). End-to-end (e2e) latency less than 10 ms may be supported, for example, for IC and V2X.

Support for ultra-reliable transmission (URC) may comprise, for example, improved transmission reliability, such as 99.999% transmission success and service availability. Support may be provided for mobility speed in the range of 0-500 km/h. Packet Loss Ratio of less than $10e^{-6}$ may be supported, for example, for IC and V2X.

Support for MTC operation may comprise, for example, air interface support for narrowband operation (e.g., using less than 200 KHz), extended battery life (e.g., up to 15 years of autonomy) and minimal communication overhead for small and infrequent data transmissions (e.g., low data rate in the range of 1-100 kbps with access latency of seconds to hours).

A 5gFLEX system may be implemented with OFDM and/or other waveforms for uplink and/or downlink. Description of examples herein is non-limiting. Examples are applicable and adaptable to other waveforms and wireless technologies.

OFDM may be used as a signal format for data transmissions, e.g., in LTE and IEEE 802.11. OFDM may efficiently divide spectrum into multiple parallel orthogonal subbands. A (e.g., each) subcarrier may be shaped using a rectangular window in the time domain, which may lead to sinc-shaped subcarriers in the frequency domain. OFDMA may rely on (e.g., perfect) frequency synchronization and tight management of uplink timing alignment within the duration of the cyclic prefix, for example, to maintain orthogonality between signals and to minimize intercarrier interference. Tight synchronization may be difficult, for example, in a system where a WTRU may be simultaneously connected to multiple access points. Additional power reduction may be applied to uplink transmissions, for example, to comply with spectral emission requirements for adjacent bands. Fragmented spectrum may be aggregated for WTRU transmissions.

OFDM (CP-OFDM) performance may be improved, for example, by more stringent RF requirements for implementations, such as operation using a large amount of contiguous spectrum that may not require aggregation. A CP-based OFDM transmission scheme may provide a downlink physical layer for 5G similar to a 4G system with modifications to pilot signal density and location.

A 5gFLEX downlink transmission scheme may be based on a multicarrier waveform that may be characterized by high spectral containment (e.g., lower side lobes and lower OOB emissions). A multicarrier (MC) waveform for 5G may comprise, for example, OFDM-OQAM and/or UFMC (UF-OFDM).

Multicarrier modulation waveforms may divide a channel into subchannels and may modulate data symbols on subcarriers in the subchannels.

In an example of Filtered Band Multi-Carrier (FBMC), such as OFDM-OQAM, a filter may be applied in the time domain per subcarrier to an OFDM signal, for example, to reduce OOB. OFDM-OQAM may cause very low interference to adjacent bands, may not need large guard bands and may be implemented without a cyclic prefix. OFDM-OQAM may be sensitive to multipath effects and to high delay spread in terms of orthogonality, which may complicate equalization and channel estimation.

In an example of Universal Filtered MultiCarrier (UFMC), such as UF-OFDM, a filter may be applied in the time domain to the OFDM signal to reduce OOB. Filtering may be applied per subband to use spectrum fragments, which may reduce complexity and make UF-OFDM more practical to implement. OOB emissions in unused spectrum fragments in a band may be as high as in OFDM. UF-OFDM may provide some improvement over OFDM at the edges of the filtered spectrum with little to no improvement in the spectral hole.

These waveforms enable frequency multiplexing of signals with non-orthogonal characteristics (such as different subcarrier spacing) and co-existence of asynchronous signals without requiring complex interference cancellation receivers. These waveforms may facilitate the aggregation of fragmented pieces of spectrum in baseband processing, e.g., as a lower cost alternative to its implementation as part of RF processing.

Co-existence of different waveforms within the same band may be considered, for example, to support mMTC narrowband operation, e.g., using SCMA. Different waveforms, e.g., CP-OFDM, OFDM-OQAM and UF-OFDM, may be combined in the same band, e.g., for all aspects and for downlink and uplink transmissions. Co-existence of different waveforms may include transmissions using different types of waveforms between different WTRUs or transmissions from the same WTRU, e.g., simultaneously, with some overlap or consecutive in the time domain.

Other co-existence aspects may include support for hybrid types of waveforms, e.g. waveforms and/or transmissions that may support, for example: a possibly varying CP duration (e.g., from one transmission to another), a combination of a CP and a low power tail (e.g., a zero tail) and/or a form of hybrid guard interval (e.g., using a low power CP and an adaptive low power tail), etc. Wavefroms may support dynamic variation and/or control of other aspects, such as how to apply filtering (e.g., whether filtering is applied at the edge of the spectrum used for reception of any transmission(s) for a given carrier frequency, at the edge of a spectrum used for reception of a transmission associated with a specific SOM, per subband or per group thereof).

An uplink transmission scheme may use the same or different waveform that is used for downlink transmissions.

Transmissions to and from different WTRUs in the same cell may be multiplexed, for example, based on FDMA and TDMA.

5gFLEX radio access may be characterized by a very high degree of spectrum flexibility that enables deployment in different frequency bands with different characteristics, which may include different duplex arrangements, different and/or variable sizes of available spectrum, such as contiguous and non-contiguous spectrum allocations in the same or different bands. 5gFLEX radio access may support variable timing aspects, such as support for multiple TTI lengths and asynchronous transmissions.

Multiple duplexing schemes (e.g., TDD, FDD) may be supported. Supplemental downlink operation may be supported, e.g., for FDD operation, for example, using spectrum aggregation. FDD operation may support full-duplex FDD and half-duplex FDD operation. DL/UL allocation may be dynamic (e.g., may not be based on a fixed DL/UL frame configuration), e.g., for TDD operation. The length of a DL or a UL transmission interval may be set per transmission opportunity.

A 5G air interface characteristic or capability may enable different transmission bandwidths on uplink and downlink ranging, e.g., varying between a nominal system bandwidth to a maximum value corresponding to the system bandwidth.

Single carrier operation may support a variety or range of system bandwidths, such as 5, 10, 20, 40 and 80 MHz, 160 MHz. Nominal bandwidths may have one or more fixed values. Narrowband transmissions (e.g., 0 to 200 KHz) may be supported within the operating bandwidth for MTC devices.

System bandwidth may refer to the largest portion of spectrum that may be managed by a network for a given carrier. The spectral portion of a carrier that a WTRU minimally supports for cell acquisition, measurements and initial access to the network may correspond to the nominal system bandwidth. A WTRU may be configured with a channel bandwidth that may be within the range of the entire system bandwidth. A WTRU's configured channel bandwidth may or may not include a nominal part of system bandwidth, e.g., as shown in an example in FIG. 2.

Figure 2:
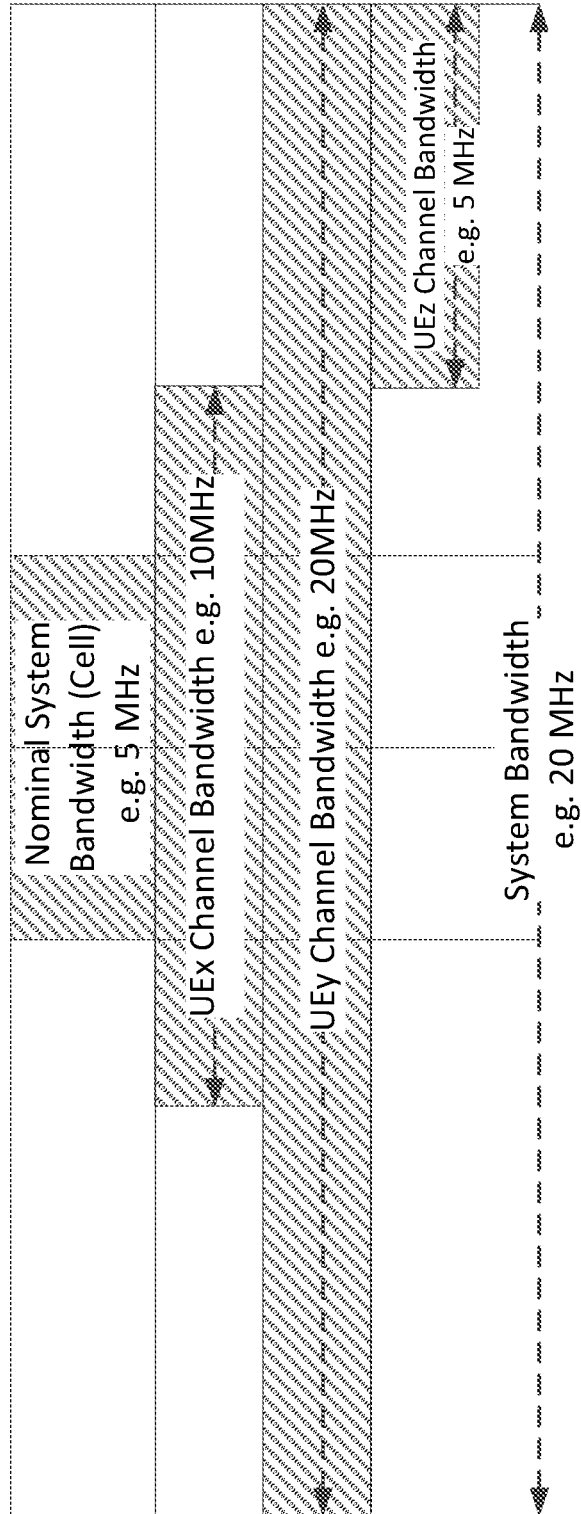
FIG. 2 is an example of transmission bandwidths.

FIG. 2 is an example of transmission bandwidths. FIG. 2 shows a nominal system bandwidth (cell) (e.g., 5 MHz), a UEx channel bandwidth (e.g., 10 Mhz), a UEy channel bandwidth (e.g., 20 MHz), and UEz channel bandwidth (5 MHz) all at different allocations, which may or may not overlap, within the system bandwidth (e.g., 20 MHz). UE refers to a WTRU. Bandwidth flexibility may be achieved, for example, because (e.g., all) applicable sets of RF requirements for a given maximum operating bandwidth in a band may be met without the introduction of additional allowed channel bandwidths for that operating band, e.g., due to the efficient support of baseband filtering of the frequency domain waveform.

A WTRU's channel bandwidth for single carrier operation may be configured, reconfigured and/or dynamically changed. Spectrum for narrowband transmissions within the nominal system, system or configured channel bandwidth may be allocated.

A 5G air interface physical layer may be band-agnostic and may support operation in licensed bands (e.g., below 5 GHz) and unlicensed bands (e.g., in the range 5-6 GHz). LBT Cat 4 based channel access framework similar to LTE LAA may be supported, e.g., for operation in unlicensed bands.

Cell-specific and/or WTRU-specific channel bandwidths for arbitrary spectrum block sizes may be scaled and managed (e.g., scheduling, addressing of resources, broadcasted signals, measurements, etc.).

Downlink control channels and signals may support FDM operation. A WTRU may acquire a downlink carrier, for example, by receiving transmissions using (e.g., only) the nominal part of the system bandwidth. For example, a WTRU may not initially receive transmissions covering the entire bandwidth being managed by the network for the concerned carrier.

Downlink data channels may be allocated over a bandwidth that may or may not correspond to nominal system bandwidth, e.g., without restrictions other than being within the WTRU's configured channel bandwidth. For example, a network may operate a carrier with a 12 MHz system bandwidth using a 5 MHz nominal bandwidth allowing devices supporting 5 MHz maximum RF bandwidth to acquire and access the system while potentially allocating+ 10 to −10 MHz of the carrier frequency to other WTRU's supporting up to 20 MHz worth of channel bandwidth.

Figure 3:
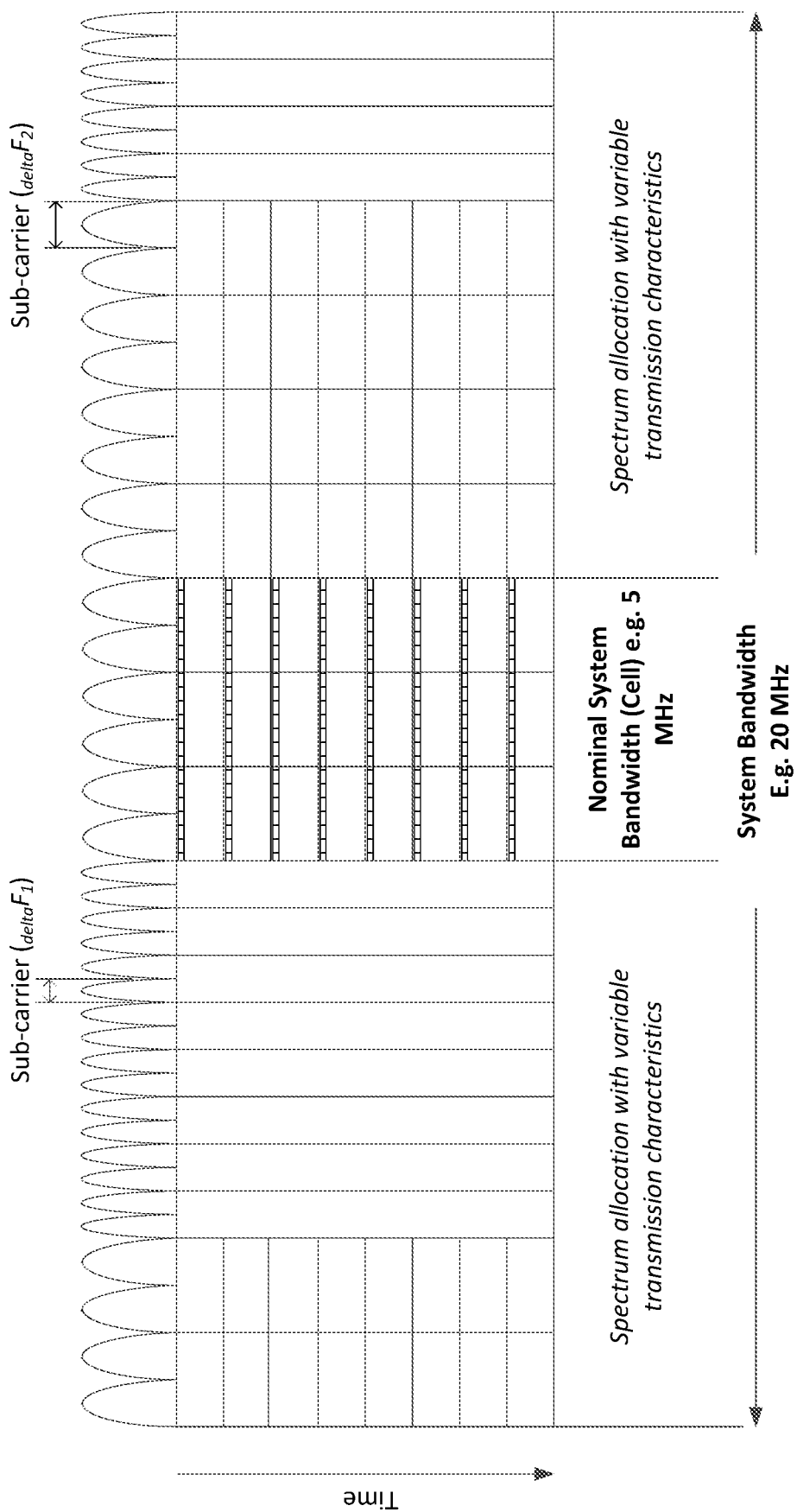
FIG. 3 is an example of flexible spectrum allocation.

FIG. 3 is an example of flexible spectrum allocation. FIG. 3 shows an example of spectrum allocation where different subcarriers may be (e.g., at least conceptually) assigned to different modes of operation (hereafter Spectrum Operation Mode or SOM). Different SOM may be used to fulfill different requirements for different transmissions. A SOM may consist of a subcarrier spacing, a TTI length and/or one or more reliability aspects (e.g., HARQ processing aspects, secondary control channel). A SOM may be used to refer to a (e.g. specific) waveform or may be related to a processing aspect (e.g., in support of co-existence of different waveforms in the same carrier using FDM and/or TDM or coexistence of FDD operation in a TDD band (e.g., with support in a TDM manner or similar)).

A WTRU may be configured to perform transmissions according to one or more SOMs. For example, a SOM may correspond to transmissions that use at least one of the following: a specific TTI duration, a specific initial power level, a specific HARQ processing type, a specific upper bound for successful HARQ reception/transmission, a specific transmission mode, a specific physical channel (uplink or downlink), a specific waveform type or even a transmission according to a specific RAT (e.g., LTE or according to a 5G transmission technique). A SOM may correspond to a QoS level and/or a related aspect (e.g., maximum/target latency, maximum/target BLER or similar). A SOM may correspond to a spectrum area and/or to a specific control channel or aspect thereof (e.g., search space or DCI type). For example, a WTRU may be configured with a SOM for a URC type of service, a LLC type of service and/or an MBB type of service. A WTRU may have a configuration for a SOM for system access and/or for transmission/reception of L3 control signaling (e.g., RRC), for example, in a portion of a spectrum associated with a system, such as in a nominal system bandwidth.

Spectrum aggregation may be supported (e.g., for single carrier operation). A WTRU may support transmission and reception of multiple transport blocks over contiguous or non-contiguous sets of physical resource blocks (PRBs), e.g., within the same operating band. Mapping of a single transport block to separate sets of PRBs may be supported. Support may be provided for simultaneous transmissions associated with different SOM requirements.

Multicarrier operation may be supported, for example, using contiguous or non-contiguous spectrum blocks within the same operating band or across two or more operating bands. Support may be provided for aggregation of spectrum blocks using different modes (e.g., FDD and TDD) and/or different channel access methods (e.g., licensed and unlicensed band operation below 6 GHz). Support may be provided for procedures that configure, reconfigure and/or dynamically change a WTRU's multicarrier aggregation.

Downlink (DL) and uplink (UL) transmissions may be organized into radio frames characterized by a number of fixed aspects (e.g., location of downlink control information) and a number of varying aspects (e.g., transmission timing, supported types of transmissions).

Basic time interval (BTI) may be expressed in terms of an integer number of one or more symbol(s), which symbol duration may be a function of subcarrier spacing applicable to the time-frequency resource. Subcarrier spacing (e.g., for FDD) may differ between an uplink carrier frequency $f_{UL}$ and a downlink carrier frequency $f_{DL}$ for a given frame.

A transmission time interval (TTI) may correspond to a minimum time supported by a system between consecutive transmissions where each may be associated with different transport blocks (TBs) for the downlink ($TTI_{DL}$), for the uplink (UL TRx), which may exclude preambles and may include control information (e.g., DCI for downlink or UCI for uplink). A TTI may be expressed in terms of an integer number of one of more BTI(s). A BTI may be specific and/or associated with a given SOM.

For example, supported frame durations may include, for example, 100 us, 125 us (⅛ ms), 142.85 us (1/7 ms may be 2 nCP LTE OFDM symbols) and 1 ms, e.g., to enable alignment with an LTE timing structure.

A frame may start with downlink control information (DCI) of a fixed time duration $t_{dci}$ preceding downlink data transmission (DL TRx) for a concerned carrier frequency— $f_{UL+DL}$ for TDD and $f_{DL}$ for FDD.

A frame may (e.g., for TDD duplexing) consist of a downlink portion (DCI and DL TRx) and (e.g., optionally) an uplink portion (UL TRx). A switching gap (swg) may (e.g., for frames of a given configuration) precede the uplink portion of the frame, e.g., when present.

A frame may (e.g., for TDD duplexing) consist of a downlink reference TTI and one or more TTI(s), e.g., for the uplink. The start of an uplink TTI may be derived, for example, using an offset ($t_{offset}$), applied from the start of the downlink reference frame that may overlap with the start of the uplink frame.

5gFLEX may (e.g., for TDD) support D2D/V2x/Sidelink operation in the frame, for example, by including respective downlink control and forward direction transmission in the DCI+DL TRx portion (e.g., when a semi-static allocation of the respective resources is used) or in the DL TRx portion (e.g., for dynamic allocation) and by including the respective reverse direction transmission in the UL TRx portion.

5gFLEX may (e.g., for FDD) support D2D/V2x/Sidelink operation in the UL TRx portion of a frame, for example, by including respective downlink control, forward direction and reverse direction transmissions in the UL TRx portion. Dynamic allocation of the respective resources may be used.

Figure 4:
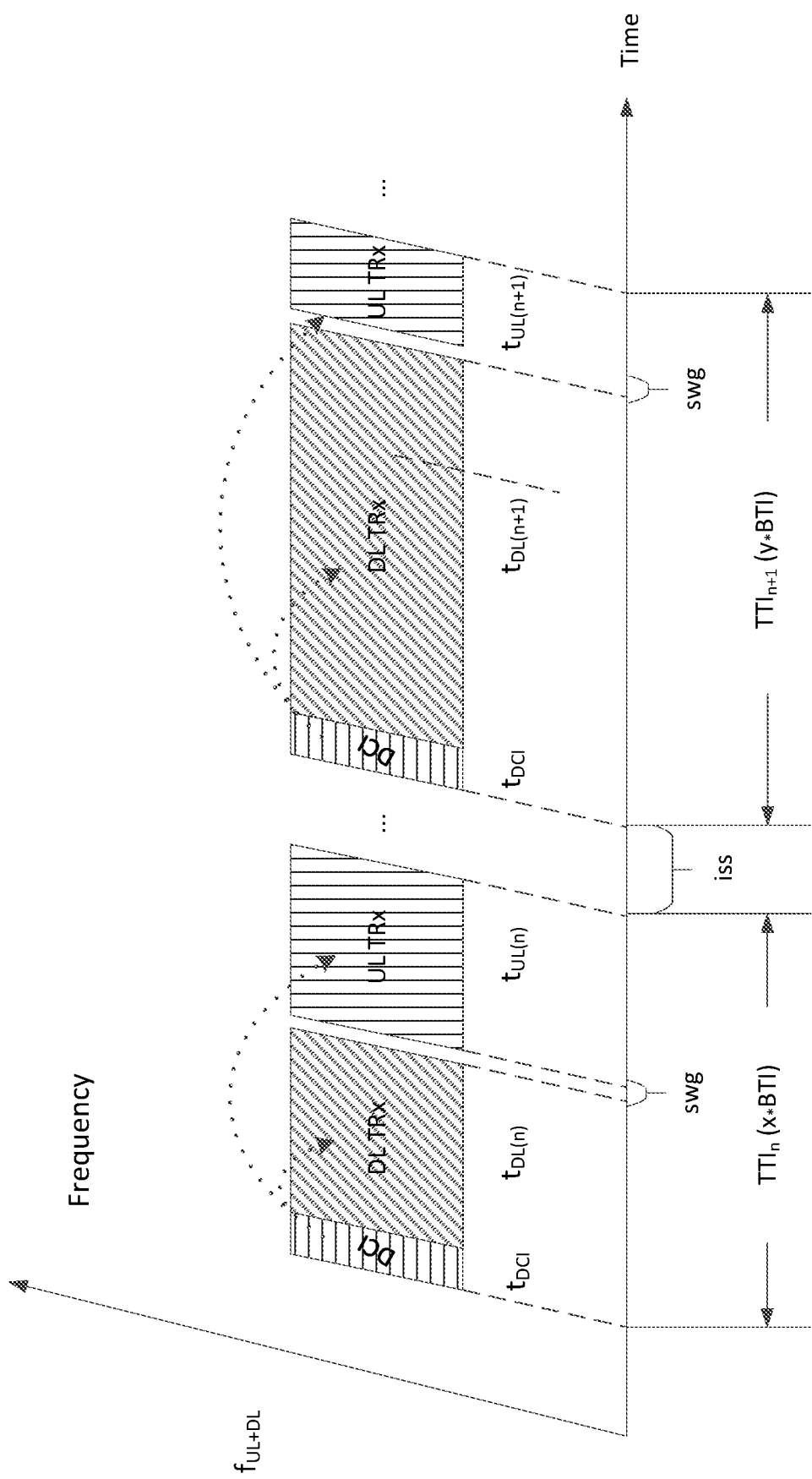
FIG. 4 is an example of timing relationships for TDD duplexing.
Figure 5:
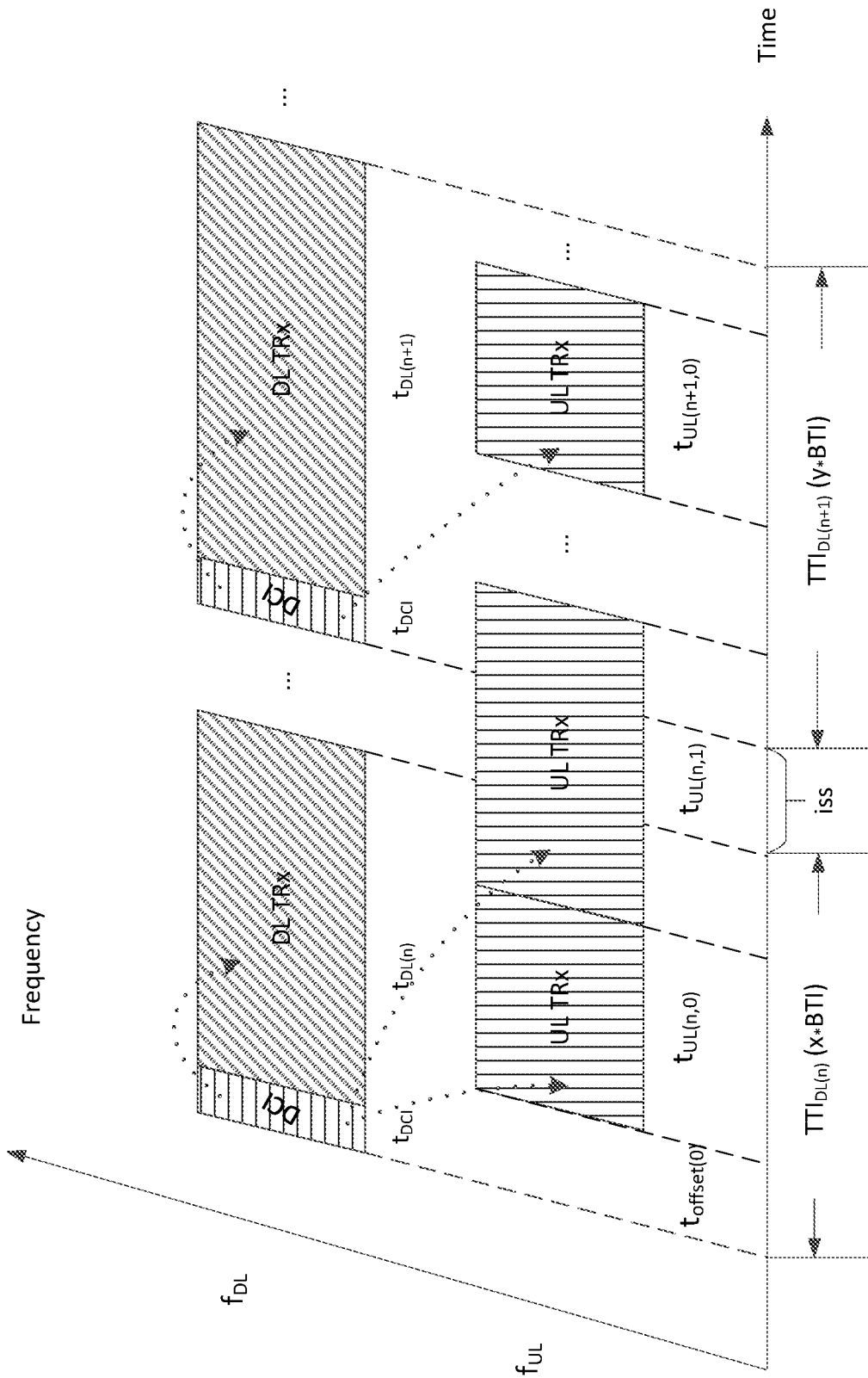
FIG. 5 is an example of timing relationships for FDD duplexing.

FIGS. 4 and 5 provide examples of frame structures. FIG. 4 is an example of timing relationships for TDD duplexing. FIG. 5 is an example of timing relationships for FDD duplexing.

A scheduling function may be supported in the MAC layer. Support may be provided for multiple (e.g., two) scheduling modes, e.g., network-based scheduling (e.g., for tight scheduling in terms of resources, timing and transmission parameters of downlink transmissions and/or uplink transmissions) and WTRU-based scheduling (e.g., for more flexibility in terms of timing and transmission parameters). Scheduling information for modes may be valid for one or more TTIs.

Network-based scheduling may enable a network to tightly manage available radio resources assigned to different WTRUs, which may permit optimal sharing of resources. Dynamic scheduling may be supported.

WTRU-based scheduling may enable a WTRU to opportunistically access uplink resources with minimal latency on a per-need basis, for example, within a set of shared or dedicated uplink resources assigned (e.g., statically or dynamically) by the network. Support may be provided for synchronized and unsynchronized opportunistic transmissions. Support may be provided for contention-based transmissions and contention-free transmissions.

Support for opportunistic transmissions (scheduled or unscheduled) may be provided, for example, to meet ultra-low latency requirements for 5G and power saving requirements for mMTC.

5gFLEX may support one or more forms of association between data available for transmission and available resources for uplink transmissions. Multiplexing of data with different QoS requirements within the same transport block may be supported, for example, when multiplexing does not introduce a negative impact to the service with the most stringent QoS requirement and does not introduce an unnecessary waste of system resources.

A transmission may be encoded using a number of different encoding methods. Different encoding methods may have different characteristics.

For example, an encoding method may generate a sequence of information units. An (e.g., each) information unit, or block, may be self-contained. For example, an error in the transmission of a first block may not impair the ability of a receiver to successfully decode a second block, such as when the second block is error-free and/or when sufficient redundancy may be found in the second block or in a different block for which at least a portion was successfully decoded.

An example of an encoding technique may include raptor/fountain codes, e.g., where a transmission may consist of a sequence of N raptor codes. One or more codes may be mapped to one or more transmission "symbols" in time. A "symbol" may correspond to one or more sets of information bits, e.g., one or more octets. Encoding may be used to add FEC to a transmission, e.g., where a transmission may use N+1 or N+2 raptor codes or symbols (e.g., assuming a one raptor code symbol relationship). A transmission may be more resilient to the loss of one "symbol" e.g., due to interference or puncturing by another transmission overlapping in time.

A WTRU may be configured to receive and/or detect one or more system signatures. A system signature may consist of a signal structure using a sequence. A signal may be similar to a synchronization signal, e.g., similar to LTE PSS and/or SSS. A signature may be specific to (e.g., may uniquely identify) a particular node (or TRP) within a given area or it may be common to a plurality of nodes (or TRPs) within an area, which aspect may not be known and/or relevant to a WTRU. A WTRU may determine and/or detect a system signature sequence and may further determine one or more parameters associated with the system. For example, a WTRU may further derive an index therefrom and may use the index to retrieve associated parameters, e.g., within a table, such as an access table. For example, a WTRU may use received power associated with a signature for open-loop power control, e.g., to set an initial transmission power when a WTRU determines that it may access (and/or transmit) using applicable resources of the system. For example, a WTRU may use the timing of a received signature sequence, e.g., to set the timing of a transmission (e.g., a preamble on a PRACH resource) when the WTRU determines that it may access (and/or transmit) using applicable resources of the system.

A WTRU may be configured with a list of one or more entries. A list may be referred to as an access table. A list may be indexed, e.g., where an (e.g., each) entry may be associated with a system signature and/or to a sequence thereof. An access table may provide initial access parameters for one or more areas. An (e.g., each) entry may provide one or more parameters necessary for performing an initial access to the system. Parameters may include at least one of a set of one or more random access parameters (e.g., including applicable physical layer resources, such as PRACH resources) in time and/or frequency, initial power level and/or physical layer resources for reception of a response. Parameters may (e.g., further) include access restrictions (e.g., PLMN identity and/or CSG information). Parameters may (e.g., further) include routing-related information, such as one or more applicable routing areas. An entry may be associated with (and/or indexed by) a system signature. An such entry may be common to a plurality of nodes (or TRPs). A WTRU may receive an access table, for example, via a transmission using dedicated resources (e.g., by RRC configuration) and/or by a transmission using broadcast resources. In the latter case, the periodicity of the transmission of an access table may be relatively long (e.g., up to 10240 ms), which may be longer than the periodicity of the transmission of a signature (e.g., in the range of 100 ms).

A Logical Channel (LCH) may represent a logical association between data packets and/or PDUs. An association may be based on data units being associated with the same bearer (similar to legacy), and/or being associated with the same SOM and/or slice (e.g., a processing path using a set of physical resources). For example, an association may be characterized by at least one of a chaining of processing functions, an applicable physical data (and/or control) channel (or instance thereof) or an instantiation of a protocol stack with (i) a specific portion being centralized (e.g., PDCP or anything beyond portions of the physical layer processing such as Radio Front (RF) end) and (ii) another portion being closer to the edge (e.g., MAC/PHY in the TRP or RF) potentially separated by a fronthauling interface. The term LCH as used herein may have a different and/or broader meaning than a similar term for LTE systems.

A WTRU may be configured to determine a relationship between different data units. A relationship may be based on a matching function (e.g., based on the configuration of one or more field values common to data units that are part of the same logical association). Fields may correspond to fields in a protocol header associated with the data unit(s). For example, a matching function may use a tuple of parameters for fields of the IP headers of a data unit, such as IP source/destination address(es), transport protocol source/destination port(s) and transport protocol type, IP protocol version (e.g., IPv4 or IPv6), etc.

For example, data units that are part of the same logical association may share a common radio bearer, processing function, SOM and/or may (e.g., at least conceptually) correspond to the same LCH and/or LCG.

A Logical Channel Group (LCG) may consist of a group of LCH(s) (or equivalent as per the definition above), e.g., where a grouping may be based on one or more criteria. Criteria may be, for example, that one or more LCH(s) may have a similar priority level applicable to all LCHs of the same LCG or may be associated with the same SOM (or type thereof), the same slice (or type thereof). For example, an association may characterized by at least one of a chaining of processing functions, an applicable physical data (and/or control) channel (or instance thereof) or instantiation of a protocol stack, which may include (i) a specific portion being centralized (e.g., PDCP or anything except RF) and (ii) another portion being closer to the edge (e.g., MAC/PHY in the TRP or RF) potentially separated by a fronthauling interface. The term LCG as used herein may have a different and/or broader meaning than a similar term for LTE systems.

A Transport Channel (TrCH) may consist of a specific set of processing steps and/or a specific set of functions applied to data information that may affect one or more transmission characteristics over a radio interface.

LTE may define multiple types of TrCH, such as the Broadcast Channel (BCH), the Paging Channel (PCH), the Downlink Shared Channel (DL-SCH), the Multicast Channel (MCH), the Uplink Shared Channel (UL-SCH) and the Random Access Channel (which may not carry user plane data). Transport channels for carrying user plane data may include the DL-SCH and the UL-SCH for the downlink and for the uplink, respectively.

An augmented set of requirements may be supported by an air interface for a 5G system. Support may be provided for multiple transport channels, e.g., for user and/or control plane data, for one or more WTRU devices. The term TrCH as used herein may have a different and/or broader meaning than a similar term for LTE systems. For example, a transport channel for URLLC (e.g., URLLCH), for mobile broadband (MBBCH) and/or for machine type communications (MTCCH) may be defined for downlink transmission (e.g., DL-URLLCH, DL-MBBCH and DL-MTCCH) and for uplink transmissions (e.g., UL-URLLCH, UL-MBBCH and UL-MTCCH).

In an example, multiple TrCH may be mapped to a different set of physical resources (e.g., PhCH) belonging to the same SOM. This may be advantageous, for example, to support simultaneous transmission of traffic with different requirements over the same SOM. An example of this may be transmitting a URLLCH along MTCCH simultaneously when the WTRU is configured with a single SOM.

A WTRU may be configured with one or more parameters associated with a characterization of how data should be transmitted. A characterization may represent constraints and/or requirements that a WTRU may be expected to meet and/or enforce. A WTRU may perform different operations and/or adjust its behavior based on the state associated with the data based on a characterization. Parameters may include, for example, time-related aspects (e.g., Time to Live (TTL)—for a packet, which represents the time before which the packet should be transmitted to meet, acknowledged, etc. to meet latency requirements), rate-related aspects and configuration related aspects (e.g., absolute priority). Parameters may (e.g., also) be changed with time while a packet or data may be pending for transmission.

A 5G air interface may support a wide variety of use cases with different QoS requirements, e.g., in terms of differentiation between applicable radio resources and transmission methods. For example, TTI duration, reliability, diversity applied to the transmission and maximum latency may vary in a wide variety of use cases.

A WTRU may face additional challenges in terms of processing bottlenecks, for example, due to increased throughput and decreased latency (e.g., shorter TTI duration and reduced processing times).

Procedures may optimize the creation and assembly of Layer 2 Protocol Data Units (e.g., MAC PDUs).

RLC segmentation, assembly, MAC layer multiplexing and PHY layer encoding may be performed after reception of a grant. Latency of a grant to UL transmission may not be improved beyond the hardware and software latency of these operations.

Procedures may be provided for segmentation, assembly and multiplexing. A scheduling function (e.g., in the network) may or may not have timely information and/or exact knowledge of QoS requirements associated with data available for transmission in a WTRU buffer. A WTRU may implement behavior to enable services that have strict reliability and/or latency requirements (e.g., for URLLC services).

A WTRU may use parameters to impact how and what data is transmitted and how PDUs are generated. A WTRU may be configured with one or more parameters associated with a characterization of how data should be transmitted. Characterization may represent constraints and/or requirements that a WTRU may be expected to meet and/or enforce. A WTRU may perform different operations and/or adjust its behavior, for example, based on a state associated with data based on a characterization.

Behavior may be related to PDU assembly and restrictions, e.g., in terms of processing time. A WTRU may determine that one or more procedures such as those described herein may be applicable.

Procedures described herein may be utilized in whole or in part, alone or in combination with any other procedure, whether described herein or elsewhere. One or more example procedures described herein may be executed or applied in part or in full on a network or a WTRU.

Procedures may be provided for determination of PHY layer parameters prior to a grant. For example, a WTRU may determine or be configured with PHY layer parameters for transmission of data prior to reception of a grant for UL transmission. Early determination of parameters may allow for some PHY layer processing to be performed by a WTRU in advance of a UL grant, which may be beneficial to allow a WTRU to perform UL transmission with minimal delay from the transmission of the UL grant for certain types of data, for example, to minimize the latency associated with a UL transmission. An early determination of PHY layer parameters may (e.g., also) be employed in conjunction with other procedures described herein.

PHY layer parameters determined prior to the grant may be applied to specific logical channels, transport channels, traffic type or SOMs. Parameters configured or provided to a WTRU in advance of grant reception may consist of, for example, one or more of the following: a modulation scheme to be applied to the data, a coding scheme and coding-related parameters, HARQ related parameters (e.g., HARQ process type or characteristics of the HARQ to be employed), a transport block size, rules for associating L2 data to specific PHY resources (e.g., which PHY resources or range of PHY resources may be used to transmit specific resources), PHY resources or a super-set of PHY resources associated with an eventual grant. PHY layer information may be a superset of the resources that may be refined by the grant itself.

Parameters may be signaled from a network. For example, a WTRU may receive PHY layer parameters in advance, e.g., through signaling by the network. Parameters may be received by a WTRU for a certain type of data (e.g., URLLC) or certain types of logical channels, transport channels or the like. Parameters may be applicable (e.g., only) to certain PHY layer resources that may be intended to carry the data. Parameters may be applicable to data transmitted in a certain set of resource blocks or in a defined frequency/time range.

A WTRU may receive PHY layer parameters from the network. Parameters may be received periodically or in response to one or more triggers. Triggers may comprise, for example, (i) a significant change in channel characteristics detected by the network or detected by the WTRU and signaled to the network, (ii) through a request from the WTRU and/or (iii) at the initiation by the WTRU of a service or logical channel, bearer, or the like, which may require the WTRU to have access to the PHY layer parameters in advance.

PHY layer parameters received by a WTRU may be valid or applicable until, for example, one or more of the following occurs: (i) a WTRU receives a new/different set of PHY layer parameters, (ii) expiration of a timer following the reception of the PHY layer parameters, (iii) reception of the grant for which the PHY layer parameters should be applied and/or (iv) transmission of (e.g., all) data by the WTRU associated with a specific flow, logical channel, bearer or the like (e.g., when the WTRU has finished transmission of all URLLC data in its buffers).

A WTRU may (e.g., further) indicate to the network when an event, such as one or more of the foregoing events occurs.

MCS may be received and used for future grants. In an example realization, a WTRU may periodically receive an MCS to be used for transmission of data on a portion of transmit bandwidth. This may, for example, be limited to a set of predefined transport blocks or similar (e.g., predefined frequency range). A WTRU may (e.g., upon reception of the periodic MCS transmissions) apply the signaled MCS to (e.g., all) transmissions made on the associated transmission bandwidth. A WTRU may determine (e.g., a-priori or based on configuration) to associate one or more L2 protocol data units with a bandwidth range and (as a result) the MCS that was signaled initially. For example, a WTRU may determine that a set of logical channels may be served with the MCS. The WTRU and may map those logical channels to the portion of the bandwidth for which the MCS has been signaled.

Periodic transmissions of MCS may be delivered to a WTRU, for example, through dedicated signaling on a PHY channel, through a MAC CE or similar communication or via RRC signaling. A WTRU may utilize an MCS following the transmission, e.g., until it receives a new or updated MCS value for the same bandwidth area. A WTRU may receive multiple different MCS values, e.g., to utilize for different bandwidth areas. A WTRU may receive MCS for (e.g. only) certain bandwidth areas.

A WTRU may receive a subset of resources that a grant may (e.g., subsequently) choose from. For example, a WTRU may receive a resource range within its transmit bandwidth. A resource range may be used, for example, to indicate to the WTRU the set of resources the WTRU may be required to transmit from when the grant arrives. A frequency range indicated by PHY layer parameters may identify a set of resource blocks usable during the validity time of PHY layer parameters, a set of subframes, TTIs or symbols usable during the validity of the PHY layer parameters or a combination thereof. A grant may indicate to a WTRU the specific resources within the initial resource range. For example, PHY layer parameters may select x resource blocks for each TTI that may be usable by the WTRU. A UL grant may indicate to the WTRU one or more of those x resource blocks to use by the WTRU to satisfy the grant.

An advantage of this technique may be to reduce latency associated with grant decoding, for example, given that a portion of the resources indicated by the grant are already known a-priori in the PHY layer information previously received by the WTRU.

A WTRU may determine its PHY layer parameters (e.g., coding, modulation, power setting, etc.) in advance of the reception of a grant. Parameters may be determined, for example, using one or more of the following: (i) measurements of SNR, CQI or similar performed by the WTRU on the DL; (ii) measurements of ACK/NACK frequency of the transmissions made on the frequency range of interest and/or (iii) measurements of reference signal power, SINR or the like related to the reference signals on the frequency range of interest.

A WTRU may be configured (e.g., dynamically or semi-statically) by a network with frequency range(s) that the WTRU may (e.g., must) use to define its own set of PHY layer parameters.

A WTRU may periodically determine its PHY layer parameters, for example, based on measurements for a frequency range or set of frequency ranges. A WTRU may associate PHY layer parameters to be applied to a transmission made on any resources for which the WTRU receives a grant.

Frequency ranges for WTRU determination of parameters nay be dynamically configured by a network. For example, a WTRU may be configured by a network to perform the above measurements and calculation of the MCS for frequency range A and B (e.g., only), where A and B may be subsets of the entire frequency. A WTRU may apply MCS A to uplink transmissions performed on frequency range A, and may apply MCS B to uplink transmissions performed on frequency range B.

Configuration of frequency ranges in which a WTRU may perform its own determination of PHY layer parameters may be configured by the network, e.g., through RRC signaling. A configuration may be changed by an updated configuration. For example, a network may utilize the frequency range with the best channel characteristics for URLLC transmissions at any given time. A network may dynamically reconfigure the frequency range for which a WTRU may perform its own determination of PHY layer parameters.

A WTRU may signal PHY layer parameters. For example, a WTRU may signal to a network the PHY layer parameters the WTRU autonomously selected. A WTRU may signal parameters, for example, during or in response to one or more of the following: (i) upon selection/determination of the parameters; (ii) during a transmission of data that uses the parameters, in which case the WTRU may signal the parameters explicitly in control information and/or implicitly based on properties of the data being transmitted that imply the use of a specific selection of control parameters; (iii) upon request by the network and/or (iv) upon the network providing resources for transmission of data or control that may or may not be intended for transmission of these parameters.

A WTRU may (e.g., also) use any combination of procedures discussed herein. For example, a WTRU may combine a first procedure that may provide a set of physical parameters with a second procedure that may provide a second set of parameters.

A WTRU may signal a Data Block Size or a TB size in the SR, BSR, RA or similar uplink transmission. A WTRU may signal a Data Block Size or a TB size that it may or will use for future transmissions. For example, a WTRU may have a set of Data Blocks prepared and ready for transmission. The WTRU may (e.g., also) have combined the Data Blocks into a transport block. The WTRU may provide the Data Block size and/or TB size in the SR, BSR, or RA transmitted to the network.

A WTRU may indicate a course size for a Data Block or TB size, for example, to allow signaling to be sent with less overhead. For example, the set of TB sizes that may be signaled by the WTRU may be limited to x levels. Signaling may be sent with a limited number of bits, which may allow the WTRU to signal one of the x levels. For example, a WTRU may signal the next TB size larger than x when it wishes to transmit a TB of size x.

A transport block size may be implicitly provided in a CRC check value. A WTRU may select its modulation and coding (MCS) (e.g., without the network providing it). A WTRU may select its transport block size, for example, based on the number of available fixed size MAC PDUs to transmit and the size of the resource grants. An MCS may be determined by a WTRU, for example, using procedures described herein. A WTRU may signal its MCS (e.g., explicitly) to the network, for example, based on one on one or more procedures described herein. Transport block size utilized by a WTRU may be (e.g., implicitly) indicated, for example, as part of a CRC check value of one or more individual MAC PDUs within a transport block. A WTRU may, for example, insert padding into (e.g., each of) fixed sized MAC PDUs to obtain a CRC check value that implicitly indicates (e.g., to the network) an overall transport block size used or that selects from one of the allowable transport block sizes. In an example, a CRC check value may implicitly signal a selection by a WTRU of a first transport block size, for example, when the CRC check value of the first encoded block transmitted is divisible by one value. A CRC check value may implicitly signal a selection by a WTRU of a second transport block size and so on, for example, when the CRC check value of the first encoded block transmitted is divisible by another value.

A MAC PDU/Transport Block may be created incrementally. TBs may be created from fixed data block sizes. This may provide an advantage over the performance of RLC segmentation, assembly, MAC layer multiplexing and PHY layer encoding after reception of a grant. Latency of a grant to UL transmission may not be improved beyond the hardware and software latency of these operations.

For example, a WTRU may perform incremental creation of a transport block through the assembly of Data Blocks with fixed size. A WTRU may, as higher layer data arrives in the WTRU buffers, perform creation of the Data Blocks immediately or, without the need to wait for information in the grant from the network, by creating Data Blocks of a fixed size immediately as the data arrives. The WTRU may create a TB, for example, by assigning it a number of Data Blocks in such a way as to occupy the size of the grant. A WTRU may (e.g., also) be given a grant that may be a multiple of the fixed Data Block size, e.g., in order to minimize padding. A WTRU may (e.g., alternatively) fit as many Data Blocks into a transport block allowed by the grant size. A WTRU may occupy any remaining data, for example, with one or more of the following: (i) padding; (ii) MAC control information, such as information about required resources, pending MAC PDUs to transmit, MAC PDU size, an indication of packets with expired TTL, etc. and/or (iii) additional coding, rate matching, or the like, which may be inserted by the PHY layer.

A WTRU may be configured to utilize a (e.g., one) or a finite set of specific Data Block sizes for a specific flow, bearer, logical channel or the like. A WTRU may (e.g., further) be restricted to use a specific Data Block size for (e.g., only) one or more particular flows, logical channel, bearer, or the like, and may not need to be restricted to a Data Block size for data associated with other flows, logical channels, bearers, or data type. For example, a WTRU may be required to utilize a specific Data Block size for data associated with URLLC or a flow with QoS characteristics associated with URLLC, but may create Data Blocks that are not restricted in size for other flows or data.

A data block may consist of, for example, an RLC PDU or a PDU associated with a different protocol layer (MAC, PDCP, etc.).

Configured Data Block sizes may be, for example, statically configured in a WTRU or signaled by a network. A WTRU may receive a set of allowable Data Block sizes, e.g., periodically or aperiodically, such as based on changes in channel conditions determined by the network. Data Block sizes may be signaled to a WTRU, e.g., via broadcast or dedicated signaling, such as part of RRC signaling in a MAC configuration.

A WTRU may receive one or more allowable Data Block size configurations to be applied for a specific (e.g., a first) service type, flow, logical channel or the like, and a different set of allowable Data Block sizes for another set of (e.g., second) service type, flow, logical channel or the like. A WTRU may (e.g., in addition) receive a configuration change to allowable Data Block sizes through (e.g., the same) signaling. A WTRU may (e.g., upon reception of a change in configuration) change the corresponding size of the Data Blocks created, for example, from the time of reception of the signaling until the reception of a new set of Data Block sizes.

A WTRU may derive fixed Data Block sizes to be used, for example, based on PHY layer information that may be provided prior to the grant. For example, a WTRU may compute an allowable Data Block size based on one or more of PHY layer parameters, such as those described herein. For example, a WTRU may determine a Data Block size to be equal to a coding block size that is provided as part of the PHY layer parameters indicated prior to the grant.

A WTRU may select one or more Data Block sizes from a set of allowable sizes to be used (e.g., independently) for each Data Block created. Selection of a data block size may be made, for one or more reasons, such as to accommodate the type of traffic at higher layers, based on size of packets received over a recent time span, the buffering capability of the WTRU and/or other implementation related aspects. A WTRU may (e.g., alternatively) select a Data Block size to be used for a specific flow, logical channel and/or the like from the list of allowable sizes. A WTRU may continue to use a selected Data Block size for the same flow, logical channel and/or the like for a finite period of time. A WTRU may (e.g., also) perform a selection upon the occurrence of other triggers, such as one or more of the following: (i) an arrival of a new type of data, (ii) the next reception of a new set of Data Block sizes, (iii) the end of a frame/superframe or similar defined boundary, (iv) periodically or upon expiration of a timer, (v) upon the detection (e.g., by the WTRU) of a change in channel quality or other similar measurements and/or (vi) upon the reception of a new configuration from the network (e.g., a change of frequency, HARQ parameters, PHY configuration or the like).

A WTRU may perform segmentation/reassembly of higher layer SDUs (e.g., IP packet or a PDCP SDU), for example, prior to the uplink grant for transmission of the associated data. Segmentation/reassembly of a packet or packets, which may be associated with a specific flow, data type, logical channel, or the like, may be performed by a WTRU at any one or more triggers, such as: (i) arrival of a packet or SDU, which may be targeted to a specific flow or associated with a specific logical channel, (ii) when a TTL of a specific packet or SDU becomes less than a threshold; and/or (iii) at the arrival of one or more SDUs where the total amount of data available for segmentation/reassembly is larger than a minimum size. For example, the minimum size may correspond to an allowable Data Block size or a Data Block size selected by the WTRU.

A WTRU may, upon reception of a higher layer SDU, perform segmentation/reassembly of the SDU, for example, so the resulting segments may be of the fixed and selected Data Block size. A WTRU may (e.g., during segmentation/reassembly) insert padding into a Data Block, for example, when (e.g., all of) the data in the buffer may be consumed during Data Block creation and does not occupy an integer number of Data Blocks with a fixed size.

A WTRU may select a Data Block size (e.g., from a list of allowable Data Block sizes), for example, that is the closest in size to a higher layer SDU that may be received or to minimize inserted padding. In an example, a WTRU may select a Data Block size (e.g., from a list of allowable sizes) that minimizes the padding, for example, when a single RLC packet associated with a specific buffer or flow may be (e.g., is) present in the WTRU at the time when Data Block creation is performed.

A WTRU may create a Data Block header per fixed size Data Block. A WTRU may (e.g., also) create a header for a collection of Data Blocks that may have a common size and/or one or more other characteristics, such as, but not limited to, logical channel, bearer type, flow type, service type and/or TTL. A WTRU may complete processing of the header, for example, when deciding the number of fixed sized Data Blocks to be transmitted at a given time. A WTRU may provide one or more headers to lower layers for encoding, e.g., along with the Data Blocks.

A Data Block may or may not contain a header. A single header may be included in an entire transport block containing multiple Data Blocks. The header may contain, for example, one or more of the following: (i) the number of Data Blocks in the transport block, (ii) the size or sizes of Data Blocks in the transport block, (iii) the flow, logical channel or service associated with a (e.g., each) Data Block and/or (iv) an amount of control information (e.g., MAC CEs) included in the transport block.

A WTRU may include (e.g. in a TB currently being transmitted) information such as the size of a pending TB to be transmitted or ready for transmission by the WTRU. For example, the information may be included in a MAC CE transmitted as part of a current TB being transmitted.

A WTRU may include (e.g., in a current TB) the Block Size or Block Sizes of prepared or pending blocks to be transmitted in a future TB.

A WTRU may perform a portion of the PHY layer processing (e.g., encoding) of Data Blocks, e.g., prior to reception of the grant on a (e.g., each) fixed sized Data Block. A WTRU may rely on PHY layer parameters, such as those described herein, to perform a portion of PHY layer processing on a (e.g., each) Data Block, e.g., prior to reception of the grant. For example, a WTRU may rely on the MCS provided in PHY layer parameters to perform CRC insertion, encoding and modulation prior to reception of a grant. A WTRU may create a transport block to be transmitted in an incremental fashion, for example, by the creation of fixed size Data Blocks as data arrives in the RLC buffer and the encoding and modulation of these Data Blocks as they are received.

A WTRU may (e.g., also) determine PHY layer processing to be performed, e.g., based on PHY layer information received. For example, a WTRU may determine, e.g., based on having received a coding scheme and coding parameters to use, that the WTRU may perform encoding prior to reception of the grant and that modulation may be provided as part of the grant.

A WTRU may (e.g., upon reception of a grant) perform, for example, one or more of the following actions: (i) multiplexing and transport block creation, (ii) insert padding bits into a (e.g., each of) the fixed size Data Blocks or the overall transport block, (iii) create or update one or more Data Block headers to include information obtained with the arrival of the grant, such as the number of Data Blocks in the TB; (iv) creation of a Data Blocks header; and/or (v) additional PHY layer processing of a (e.g., each) Data Block or of the entire transport block.

MAC multiplexing and transport block creation may be provided. A WTRU may, e.g., at grant reception, determine the number of available Data Blocks that have been constructed and processed (e.g., potentially with additional PHY layer processing, such as coding and modulation) prior to the grant that are ready to be transmitted. The WTRU may select a subset of Data Blocks to be transmitted in the grant. The selection criteria may be, for example, based on one or more of the following: (i) Data Blocks selected may contain data from a flow, logical channel, or service indicated in the grant, the data blocks are allowable based on the grant e.g. (in the case the grant allows for a number of flows) or the data blocks are fixed size Data Blocks created based on prior knowledge of the Data Block size; (ii) a WTRU may service the grant, e.g., by including the Data Blocks in a first come first serve basis, whether on a single flow, logical channel, service or over one or more (e.g., all) flows, logical channels, or services; and/or (iii) the WTRU may service the grant based on some QoS related parameters.

MAC multiplexing may occur, for example, by TTL. For example, a WTRU may insert all Data Blocks in increasing order of TTL.

MAC multiplexing may occur, for example, by logical channel priority and TTL. For example, a WTRU may (e.g., first) include all Data Blocks, where the data may be associated with the Data Block having data for which the TTL may be below a specific threshold, and (e.g. second) perform LCP for any additional space in the grant.

MAC multiplexing may occur, for example, by relationship between Data Blocks. For example, a WTRU may perform selection of Data Blocks based on a pre-defined relationship between the Data Blocks that may be indicated as part of the QoS. For example, some Data Blocks may have been formed from the same IP or PDCP packet. A WTRU may include related Data Blocks within the same transport block, e.g., due to an indication from the QoS information that it is preferred or required.

MAC multiplexing may occur, for example, by restriction of QoS allowable in Grant. For example, a WTRU may perform selection of Data Blocks by selecting (e.g., only) Data Blocks associated with (e.g., only) a single or restricted set of flows, logical channels or services. An association may be identified in the grant or may be known apriori in the WTRU, e.g., based on characteristics of the grant with respect to PHY layer parameters or Data Block sizes signaled to the WTRU prior to the grant.

A WTRU may (e.g., autonomously) determine a URLLC Grant. For example, a WTRU may autonomously determine that a grant may (e.g., should or must) be used to transport data of one or more particular flows, logical channels, services. A WTRU may restrict (e.g., only) Data Blocks associated with those flows/logical channels/services to be selected and included in the transport block.

A difference between TB size and grant size may be minimized. For example, a WTRU may select available Data Blocks so that the difference of the grant size and the TB size may be minimized. A combination of available Data Blocks for transmission that may result in minimization of the difference may be employed.

Selection criteria may be utilized by a WTRU, for example, regardless whether it creates fixed sized Data Blocks or whether the Data Blocks are sized dynamically (e.g., as the grant arrives).

A Data Block ACK/NACK may be provided. A WTRU may be configured to transmit transport blocks containing one or more data blocks, e.g., each with its own CRC referred to as a data block CRC. A transport block may carry its own CRC, which may be referred to as a TB CRC. An encoder may be configured to insert smaller length CRCs to a (e.g., each) code block, for example, to enable power saving via early detection of decoding failure.

A transport block (TB) NACK may occur, for example, when a pre-configured ratio or number of data blocks is in error. A network may (e.g., correctly) receive transport blocks (e.g., all associated data blocks) without error, in which case it may be configured to transmit an ACK to the WTRU on a dedicated control channel. A network may detect an error related to a transport block, e.g., due to one or more of the data blocks being received in error. A network may be configured to determine whether to transmit ACK or NACK (e.g., a HARQ-ACK) to the associated TB transmission, for example, depending on the number of data blocks in error in the transport block. For example, a base station or TRP may be configured (e.g., via another instance in the network or via OAM) to transmit NACK when more than a specific number or ratio of data blocks are in error. For example, a TRP may be configured to transmit NACK when more than 50% of the data blocks are in error. A motivation may be to trigger a HARQ retransmission (e.g., only) when it is expected (e.g., statistically) that there may be HARQ combining gain. Otherwise, it may be more advantageous to retransmit (e.g., only) the data blocks in error, for example, at the expense of additional feedback signaling or additional delay (e.g., by letting the RLC or ARQ entity handle the error case). A WTRU may (e.g., also or alternatively) be configured (e.g., as a special case) to transmit a HARQ-NACK when (e.g., only) one data block is in error. This special case may represent an ACK or NACK on the whole of a TB.

One or more example procedures described herein may be executed or applied in part or in full on a network or a WTRU, for example, when a network transmits multiple data blocks to a WTRU. A WTRU may be configured with a ratio or a number of data blocks in error above which it transmits a HARQ-NACK.

A fast aggregated data block status report may be provided for ultra-low latency retransmissions. For example, a base station may be configured to provide fast status report feedback for data blocks to trigger data-block retransmissions, which may be new transmissions from the HARQ perspective. The size of the feedback may be variable, for example, given that the number of data blocks may vary. Feedback may be aggregated across multiple TTIs.

An aggregated data block Ack/Nack message may consist of one or more Ack/Nack fields (e.g., 1 bit fields). A (e.g., each) field may correspond to a (e.g., one) data block in an associated uplink transmission. An aggregated data block Ack/Nack message may be transmitted by a TRP, e.g., over a predefined dedicated resource. A WTRU may determine the size of an aggregated data block Ack/Nack message, for example, based on an associated uplink grant (e.g., with an implicit time association between UL grant and DL feedback). In an (e.g., another) example, an aggregated data block Ack/Nack message may be transmitted by a TRP over a set of resources associated with the resources of the associated UL transmission.

In an example, a TRP may schedule an aggregated data block Ack/Nack message along a UL grant. For example, a TRP may indicate resources for an aggregated data block Ack/Nack message that may occur at a later time. In an example, a WTRU may be configured to transmit an aggregated data block Ack/Nack message (e.g., only) when scheduled by a TRP.

In an example, a similar approach described for uplink may be applicable to downlink. A TRP may be configured to transmit multiple data blocks in a transport block. A WTRU may be configured to transmit an aggregated data block Ack/Nack message. A WTRU may be scheduled with resources that may be used or needed for an aggregated data block Ack/Nack message in the DCI associated with the associated transmission. A WTRU may receive the aggregated data block Ack/Nack message grant and transmit the grant on the associated resources. A WTRU may be configured to not transmit the aggregated data block Ack/Nack message, for example, when not scheduled on the DCI. A network may (e.g., alternatively) configure a set of resources dedicated for transmission of aggregated data block Ack/Nack.

In an (e.g., another) example, a WTRU may be configured to transmit an aggregated data block Ack/Nack message over L1, for example, when no data is being transmitted, or (e.g., when there is data being transmitted) the WTRU may be configured to transmit the aggregated data block Ack/Nack in a control message along with the data (e.g., in a MAC header).

The size of an aggregated data block Ack/Nack message may be variable from TTI to TTI, although the size may be known to the network, e.g., due to scheduling grant. A WTRU may be configured to transmit an appropriate format for an aggregated data block Ack/Nack message, e.g., following an associated DCI.

Flexible grant sizes may be permitted, e.g., while satisfying a PDU assembled prior to reception of the grant. For example, a WTRU that performs MAC PDU assembly prior to the assignment of a grant may flexibly employ a resulting grant or grants to allow it to be tailored to the assembled MAC PDU. A WTRU may (e.g., autonomously) determine a number of grants or size of each grant needed to transmit an assembled MAC PDU.

Grants may span multiple consecutive TTIs. For example, a WTRU may be assigned a grant that spans multiple TTIs, multiple subframes, multiple frequency blocks or a combination thereof. Grants may be defined, for example, so that a portion of a grant on a given TTI, subframe, frequency block or the like, may be a unit portion of the overall grants. A WTRU may utilize a subset or multiple units of a grant and may provide indication to the network if and when it has completed use of a grant, e.g., to permit a network to determine the overall size of the transport block transmitted.

In an example, a WTRU may receive a grant for x resource blocks that may occur repetitively over y consecutive TTIs. The x resource blocks may be the same in each of the y consecutive TTIs. The x resource blocks may (e.g., alternatively) change from one TTI to the next, e.g., in order to provide diversity in frequency. The x resource blocks may change from one TTI to the next, for example, according to one or more of the following: (i) a fixed rule known by the WTRU (e.g., [resBlock X+m] mod BW); (ii) a rule indicated in the grant itself (iii) a rule defined using broadcast or dedicated signaling prior to the grant and/or (iv) a rule specific to the cell or TRP to which the WTRU is connected and may potentially be provided by the access table or similar system information specific to the system signature.

In an example, the value of y may not be defined and a grant may last indefinitely until indicated by the WTRU.

A WTRU may, e.g., upon reception of a grant, perform PHY layer encoding and modulation of a MAC PDU that is ready for assembly according to the modulation and encoding provided in the grant. A WTRU may receive a (e.g., single) modulation and encoding to be utilized across the entire grant. A WTRU may (e.g., alternatively) receive different encoding or modulation parameters to use for each TTI associated with a grant.

A WTRU may, e.g., prior to starting an encoding process, insert padding or additional redundancy control information or data in the MAC PDU, e.g., to ensure that the resulting encoded and modulated PDU (e.g., fully) occupies an integer number of grant units (e.g. the resources granted in M consecutive TTIs).

A WTRU may indicate to a network a termination/size of a transport block (TB). For example, a WTRU may, e.g., at any time during or following the processing of a grant, indicate to the network, the number of consecutive TTIs it may (e.g., will) utilize and (e.g., therefore) the termination of the transport block, e.g., to inform the network of the size of the transport block transmitted. A WTRU may indicate the termination of the transport block to the network, for example, using one of the following procedures: (i) a WTRU may indicate the number of TTIs utilized to the network using PHY signaling, such as, but not limited to, PUCCH, SRS-like, RACH-like or similar signaling; (ii) a WTRU may indicate the number of TTIs utilized to the network using a MAC CE provided as part of the transport block; (iii) a WTRU may transmit, e.g., in part of the resources of the last TTI, a special signal indicating the end of transmission and/or (iv) a WTRU may perform padding or subdivision of a MAC PDU into blocks at the PHY layer such that one or more block CRCs may have a CRC value indicating a number of TTIs utilized to transmit the transport block.

A WTRU may decide to combine separate grants to transmit a single TB. For example, a WTRU may select two or more UL grants to use in transmitting a single TB. A WTRU, e.g., having received multiple grants in the same subframe or TTI, may decide to utilize those grants in combination to transmit a single TB.

A WTRU, e.g., having been provided separate grants with potentially different transmission parameters (MCS, coding, power, etc.), may select the set of parameters associated with one of the grants, e.g., in order to perform modulation and coding on the entire TB, for example, provided that it allows the TB to be transmitted with the entire set of resources. For example, a WTRU may select the grant that results in the least overall data bits transmitted, e.g., to allow it to transmit the TB into the associated grant. A WTRU may include control (e.g., MAC CE, which may include buffer status), padding and/or additional coding, for example, when a resulting encoded TB does not fully occupy the entire combination of resources with the selections made by the WTRU.

A WTRU may not need to indicate the selected transmission parameters used to perform the transmission. A WTRU may (e.g., alternatively) signal selected transmission parameters using PHY signaling. A WTRU may indicate selected transmission parameters, for example, by transmission of an index that may refer to the grant chosen for the transmission parameters. An association between an indicated index and grant may be defined, for example, using static rules. For example, a grant referencing resources in the lowest frequency range may be associated with the lowest frequency range. A WTRU may (e.g., alternatively) provide in PHY layer signaling a property associated with the grant itself. For example, a WTRU may provide a modulation index of the grant whose transmission parameters may (e.g., will) be used to transmit the entire grant.

A WTRU may decide to combine resources or initial transmission and retransmission. For example, a WTRU may combine the resources allocated to it for initial transmission and retransmission of a TB, e.g., in order to transmit a single TB instead of multiple TBs.

A WTRU may be provided, e.g., explicitly or implicitly, with resources for eventual retransmission (e.g., in case of failed transmission). A WTRU may (e.g., when a TB occupies more than the resources provided for initial transmission) indicate this to the network, e.g., using one or more of the procedures described herein for UL indication.

A WTRU may encode an entire transport block according to modulation and coding provided by a grant. A WTRU may transmit a portion of a transport block on the resources for an initial transmission. A WTRU may (e.g., at the time resources for retransmission become available) transmit the remainder of the resources of the TB block. This may be repeated multiple times (e.g., the number of retransmissions allowed for an initial UL transmission) until the TB has been completely transmitted.

A WTRU may perform retransmission of the TB on a new resource or set of resources scheduled by the network, for example, when a transmission of a TB over multiple resources associated with UL grant and retransmissions failed. A WTRU may retransmit an entire TB on a single grant provided by the network, e.g., where the size of the grant may be tailored to the TB size.

A WTRU may send an indication to allocate more resources to complete TB transmission. For example, a WTRU may transmit a portion of a TB in a grant provided by a network and may provide an indication to the network that the entire transport was not transmitted. An indication may (e.g., further) provide the remaining size of the TB. A WTRU may perform transmission of the remainder of a TB when the network provides a grant. A grant may be (e.g., specifically) dedicated to addressing the remaining data associated with the transport block.

Transport blocks may be generated early. In an example, a WTRU may be allowed to generate one or more transport blocks (or MAC PDUs) prior to the reception of signaling allowing transmission of the one or more transport block in specific resources, where the signaling may comprise a grant received from downlink control information. Pre-generation may be feasible, for example, when used in conjunction with variable transmission durations.

In an example, one or more applicable transmission parameters for physical layer processing of the MAC PDU may be determined, e.g., at the time of creation of the MAC PDU (e.g., prior to reception of the grant). For example, a WTRU may determine a coding scheme and/or coding rate applicable to a pre-generated MAC PDU of a given transport channel, for example, based on an indication received from physical layer, MAC or RRC signaling, prior to reception of the grant. One or more remaining applicable transmission parameters for physical layer processing may be signaled, e.g., as part of the grant. For example, a WTRU may determine a modulation scheme (e.g., QPSK or 16-QAM) based on information received from the grant. For example, a grant may (e.g., explicitly) indicate a modulation scheme. A grant may (e.g., alternatively) indicate a duration and/or frequency allocation for a transmission. A WTRU may implicitly derive the modulation scheme that may (e.g., needs to) be applied to accommodate (e.g., all) coded bits in the indicated duration and/or frequency allocation.

A WTRU may determine the size of a MAC PDU, for example, according to one or more of the following solutions: (i) from an explicit indication and/or (ii) from a target duration and/or recently used set of transmission parameters.

In an example, the size may be determined from an explicit indication from physical layer, MAC or RRC signaling, e.g., potentially for each type of service or transport channel. For example, a WTRU may be signaled a MAC PDU size of 3000 bits for a first transport channel and a MAC PDU size of 10000 bits for a second transport channel.

In an example, a WTRU may determine the size of a MAC PDU, for example, based on one or more of the following: (i) a target duration for the transmission; (ii) a required duration of a transmission carrying a MAC PDU for an assumed set of transmission parameters, such as a frequency allocation, a modulation scheme, a coding scheme and/or a number of spatial layers on which the MAC PDU is mapped.

One or more of the assumed set of transmission parameters may be determined, for example, based on one or more of the following: (i) a recent or the latest transmission or latest initial HARQ transmission that took place for a MAC PDU of the corresponding transport channel (e.g., modulation and coding); (ii) a currently applicable transmission parameter for physical layer processing of MAC PDU (e.g., a coding scheme and/or rate) and/or (iii) an explicit indication from physical layer, MAC or RRC signaling (e.g., a frequency allocation or number of subcarriers or resource blocks that the WTRU may assume may be signaled).

A target duration for a transmission may be determined, for example, from an explicit indication from physical layer, MAC or RRC signaling. A target duration may be provided for each type of transport channel. A WTRU may set the size of a MAC PDU, for example, so that the duration of transmission for the MAC PDU may (e.g., would) match or approximately match a target duration with the assumed set of transmission parameters. This approach may ensure that the (e.g., required or maximum) duration for the transmission of a MAC PDU remains relatively close to the target despite the fact that other transmission parameters that will be applicable to the transmission of the MAC PDU may differ from the assumed set of transmission parameters, e.g., due to change of radio conditions.

Conditions may be provided or otherwise known to pre-generate additional MAC PDUs. For example, a WTRU may (e.g., only) pre-generate one or more new MAC PDUs when one or more conditions are satisfied, such as one or more of the following, for example: (i) the number of outstanding pre-generated MAC PDUs may not exceed a first threshold, where a threshold may, for example, be pre-defined or obtained from physical layer, MAC or RRC signaling; (ii) the amount of data in outstanding pre-generated MAC PDUs (which may include the one or more new MAC PDUs to be pre-generated) does not exceed a second threshold.

In an example, a second threshold may be pre-defined or obtained from physical layer, MAC or RRC signaling. A threshold may (e.g., alternatively) be based on the amount of data that may be transmitted within a target duration for an assumed set of transmission parameters. An assumed set of transmission parameters may be obtained, for example, according to one or more techniques described herein. In an example, a WTRU may pre-generate new MAC PDUs, for example, when the total duration required for the transmission of (e.g., all) outstanding pre-generated MAC PDUs may not exceed a threshold, such as 5 ms. A target duration may be, for example, pre-defined or obtained from physical layer, MAC or RRC signaling.

A pre-generated MAC PDU may be transmitted. For example, a WTRU may receive signaling (e.g., a grant) allowing transmission of one or more MAC PDUs in a resource. A transmission may be conditional, e.g., based on a clear channel assessment condition, for example, when the WTRU operates in an unlicensed band. The one or more MAC PDUs may have been pre-generated, for example, according to one or more techniques described herein.

A WTRU may receive one or more transmission parameters, such as one or more of a frequency allocation, a modulation scheme, a coding scheme and/or rate or a number of spatial layers. One or more parameters may have been provided prior to signaling allowing transmission of the MAC PDU. A WTRU may determine a required duration of a transmission, for example, so that a sufficient number of resource elements may be available for mapping modulation symbols. The determination may take into account the one or more parameters and/or any (e.g., required) reference signal and/or physical control information to be multiplexed with higher layer data. A WTRU may perform the transmission accordingly.

In an example, a WTRU may transmit control information to assist a receiver in the determination of a transmission duration. For example, a WTRU may provide an indication of the duration expressed as a number of time units (e.g., symbols or subframes) encoded in uplink or sidelink control information, such as in a scheduling assignment. In an (e.g., another) example, a WTRU may transmit an indication in a (e.g., the last or after the last) symbol of the transmission indicating that the transmission does not continue. In an (e.g., another) example, a WTRU may multiplex control information in pre-defined resources occurring in (e.g., every) time unit (e.g., in every subframe) indicating whether the transmission continues in the subsequent time unit.

A WTRU may receive a maximum transmission duration, for example, as part of a grant or from previous signaling. A WTRU may, for example, when a transmission duration for a MAC PDU may (e.g., would) exceed a maximum, perform, for example, one or more of the following: (i) discard the MAC PDU; (ii) transmit an indication that the maximum transmission duration is too small for the transmission of the MAC PDU, where an indication may, for example, be encoded as physical control information or as MAC signaling in a MAC PDU created for this purpose and/or (iii) modify at least one transmission parameter, such as a coding scheme, coding rate or modulation scheme, e.g., compared to the signaled transmission parameter, for example, so that the total required duration may not exceed the maximum. In an example, a WTRU may employ a higher order modulation (e.g., 16-QAM instead of QPSK), a higher (e.g., effective) coding rate (e.g., ¾ instead of ⅓), which may be implemented, for example, by puncturing a number of coded bits. A WTRU may transmit an indication whether a modification has been applied and/or of the modified value, for example, in uplink or sidelink control information.

A minimum guaranteed TBS may be provided. For example, a WTRU may be configured with a minimum guaranteed TBS. A configuration may be received, for example, by RRC or by MAC CE. A configuration may be applicable to a (e.g., specific) data unit, for example, based on the type of data, the logical association (e.g., with a data flow, a LCH, a LCG, a corresponding SOM, a corresponding service, groups thereof or the like). A WTRU may be configured, for example, to permit it to perform one or more processing steps, e.g., for the creation of a MAC PDU ahead of the reception of downlink control information and/or ahead of the final determination of the TBS for an uplink transmission.

MAC processing may occur ahead of TBS information. For example, a WTRU may perform a number of MAC processing steps ahead of the final determination of (e.g., all) transmission parameters, such as the TBS for a transmission and/or for an applicable data unit (e.g., a MAC SDU). A MAC PDU may include a segment of a data unit (e.g., by RLC segmentation of by MAC segmentation).

A MAC PDU may be assembled with a single TBS value, padding and/or concatenation. For example, a WTRU may assemble a MAC PDU using a configured minimum guaranteed TBS (TBSmin). A single value may be configured. A WTRU may (e.g. alternatively) consider a single value as valid out of a plurality of values, e.g., based on reception of control signaling (DCI, MAC CE) that may indicate a valid value, for example, based on previously reported QoS parameters such as minimum PDU size, based on reported channel quality information or the like. A WTRU may (e.g., subsequently) determine a final value of a TBS (TBSfinal) for a transmission, for example. from the reception of a DCI that grants uplink resources.

A WTRU may assemble a MAC PDU for each value (e.g., when there are multiple values) of a configured minimum guaranteed TBS (TBSmin). The WTRU may (e.g., subsequently) determine the final value of the TBS (TBSfinal) for the transmission, for example, from the reception of a DCI that grants uplink resources.

TBS may be adapted over time. For example, a WTRU may determine a final set of parameters for a transmission that uses minimum TBS guarantees associated with a single transport block (TBSfinal), e.g., from the reception of downlink control signaling. A received DCI may explicitly indicate a specific data unit to be served with a transmission. A received DCI may indicate a processing time applicable to the transmission, e.g., so that a WTRU may be instructed to perform a transmission at time n+x μsec/ms/subframes or some other unit in time for a DCI received at time n. In an example, a WTRU may determine the shortest duration of the transmission of a TB, for example, based on the signaled MCS, set of PRBs etc., e.g., using the smallest configured TBS value that is larger than the TBS resulting from the information included in the DCI signaling. In an example, a WTRU may determine the shortest duration matching in time a framing boundary (e.g., matching the end of a DL transmission portion of a subframe) that may fit the smallest configured TBS value that is larger than the TBS resulting from the information included in the DCI signaling. For example, this may be conceptually similar to a bundling operation in time based on implicit (e.g., signaled TBS smaller than minimum TBS) or explicit (e.g., indicated in the DCI) indication. In an example, a WTRU may perform a multi-TTI TB transmission (e.g., for a single MAC PDU for an applicable data unit) or TTI bundling (e.g., for multiple segments, such as RLC or MAC as separate MAC PDUs for an applicable data unit) for the transmission of pre-assembled MAC PDU(s). the number of TTIs may be an integer determined based on a guaranteed/configured TBS value (e.g., TBSmin) and the TBS value resulting from the information in a DCI.

A WTRU may (e.g. when the size of TBSfinal is larger than TBSmin) add padding to the pre-assembled MAC PDU, e.g., so that the PDU size matches the value TBSfinal. Padding may include one or more MAC CE, such as a BSR or a padding BSR. A WTRU may (e.g., alternatively) concatenate further data (e.g., with or without padding information) to the pre-assembled MAC PDU such that the PDU size matches the value TBSfinal.

A WTRU may select a pre-assemble PDU that may be associated with a different (e.g., specific) data unit, if any, for example, when the size of TBSfinal (with or without multi-TTI transmission) may be smaller than a pre-assembled PDU with an applicable value for TBSmin. A WTRU may (e.g., alternatively) assemble a new MAC PDU that matches the TBS of the transmission or the WTRU may perform the transmission of padding only.

A WTRU may include in an uplink transmission an indication of a desired TBS and/or an increase/decrease indication thereof, such as discrete values within a set of configured values. An indication may be applicable to a specific type of data unit and/or configuration. An indication may be included in a BSR or provided using bits in a MAC PDU header representing an index to preconfigured set of values. An indication may be a request for an increase in processing time.

A WTRU may use information regarding a minimum guaranteed TBS for a determination of the LCH (or equivalent) from which data may be served for the assembly of a MAC PDU. One or more other aspects, such as latency, time to live, PBR, priorities or the like, may be taken into consideration, for example, according to one or more procedures described herein.

Any of the above procedures may be applicable, for example. when a WTRU performs assembly of MAC PDUs when a grant is decoded and (e.g., all) information is known, such as when a WTRU is configured to serve data from a specific LCH (or equivalent) based on a minimum configured data unit size.

A network (NW) may (e.g., using a procedure described herein) configure one or more minimum TBS. A WTRU may determine whether padding may be included in a received transmission, e.g., to determine whether a WTRU performs pre-assembly of MAC PDUs and/or concatenation. A network may vary the TTI duration of a transmission, for example, to ensure that a minimum TBS size may be (e.g., always) available, e.g., even as the radio link and/or the HARQ operating points changes. In other words, a network may perform adaptation of WTRU transmission for a data unit and/or a MAC SDU in time, e.g., in addition to adaptation based on MCS and/or frequency. For example, this adaptation may be useful when a network may (e.g., need to) guarantee a minimum TBS with a specific HARQ operating point for varying link adaptation needs and/or for varying link quality. In an example, a DCI may indicate a longer processing time for a WTRU, for example, following the reception of an empty MAC PDU (e.g., containing only padding) and/or the reception of an indication that the current TBS is insufficient.

Transmission parameters may be selected, for example, using blind decoding or a DCI reception procedure.

In an example, a WTRU may determine one or more parameters associated with a transmission, e.g., based on the decoding of a control channel. A WTRU may perform a determination, for example, based on parameters used for a decoding attempt deemed successful in its outcome. A WTRU may determine success, for example, based on successful CRC verification for the received DCI. A DCI may indicate an uplink and/or a downlink transmission.

One or more parameters may correspond to a set of parameters. A WTRU may use a procedure to determine one or more of a plurality of sets of parameters. A set may be a configuration aspect of a WTRU. For example, one or more (e.g., a set of) parameters may correspond to a transmission characterized by higher reliability, lower latency, best-effort type of transmission or to another type of service, e.g., paging, system information reception, broadcast transmission, or the like. A set may correspond to a SOM.

Decoding a control channel may correspond to a blind decoding attempt. A WTRU may perform one or more decoding attempts, e.g., each attempt using a different set of decoding aspects (e.g., parameter(s) and/or procedure). A decoding aspect may include the set and/or the amount of physical resources used for a channel (e.g., control channel elements), the Aggregation Level (AL), the size of the CRC (e.g., 8 bits, 16 bits and/or distinguished by using different polynomials), the associated search space, the identity of the corresponding control channel or a combination thereof.

Robustness of DCI may indicate something on a transmission. For example, a WTRU may determine that a DCI received has been successfully decoded according to one of a plurality of robustness/reliability levels. A WTRU may determine an appropriate value for one or more parameters associated with a transmission, for example, so that a similar reliability level may be assumed for the transmission. For example, a network may determine an explicit/implicit indication to use, e.g., based on applicable link adaptation mechanisms such as uplink control information and/or channel state indications received from the WTRU.

A WTRU may determine a minimum level of robustness and/or QoS level applicable to a transmission, for example, based on a determined set of one or more parameters. For example, a WTRU may determine an applicable SOM. The WTRU may (e.g., further) determine data applicable to a UL transmission based on the associated QoS level.

A WTRU may determine HARQ processing and/or feedback. For example, a WTRU may determine the type of HARQ processing to apply to a transmission (e.g., in case of an initial transmission, uplink or downlink) and/or the type of HARQ feedback (e.g., required) for a transmission, e.g., based on of a determined set of one or more parameters. For example, a WTRU may (e.g., for reception of a DL transmission) determine, e.g., based on of the identified set of parameters, that HARQ feedback may be expected in (or within) a certain time interval using a specific transmission procedure (e.g., an applicable uplink control channel) or that feedback should not be automatically generated (e.g., only upon request). For example, a WTRU may determine an applicable SOM and may perform HARQ processing and/or feedback accordingly.

Robustness may be signaled in a grant. For example, a WTRU may receive signaling (e.g., implicitly or explicitly) in a DCI to indicate that transmissions associated with a specific grant may be performed based on a different set of parameters associated with a flow, service type, SOM, or the like. For example, a WTRU may receive (e.g., in a grant) an indication that a corresponding transmission may be used for transmission of URLLC data (if any) and that the transmission parameters may be modified and/or selected accordingly, e.g., to allow for more robust transmission and/or lower latency.

For example, a WTRU may perform a similar determination for a DCI that schedules a downlink transmission, such that it may appropriately determine parameters to decode an associated transmission.

A WTRU may determine a robustness level of a received grant, for example, based on decoding a DCI. The WTRU may determine such robustness level, for example, according to one or more of the following: (i) characteristic(s) of the decoding attempt leading to success, such as one or more of the AL associated with the successfully decoded DCI, the size of the CRC associated with the successfully decoded DCI, the CRC polynomial associated with the successfully decoded DCI, the CCEs (or the initial CCE) associated with the successfully decoded DCI, the Search Space (or start thereof) associated with the successfully decoded DCI and/or the associated control channel type, resource in time/frequency and/or identity; (ii) the DCI format received and/or (iii) an explicit indication in a field in the DCI format.

A WTRU may be configured for association with a robustness level and/or set of parameters.

A robustness level may be determined from an aggregation level or CRC. For example, a WTRU may determine a robustness level based on the aggregation level or search space that resulted in a successful decoding of a DCI. For example, a robustness level may be determined as a first value when an aggregation level is determined to be 1, 2, or 4 (e.g., an aggressive AL for a certain reliability operating point) and as a second value when an aggregation level is determined to be 8 or 16 (e.g., a conservative AL for a higher reliability operating point).

In an example, a WTRU may determine a robustness level based on the size of CRC for which decoding of the DCI succeeded. For example, a CRC of 8 bits may indicate the use of a normal robustness level (e.g., a first set of transmission parameters) while a CRC of 16 bits or 32 bits may indicate the use of a higher robustness level (e.g., a second set of transmission parameters).

Transmission parameters may be selected based on robustness level. For example, a WTRU may select transmission parameters to be used for a UL transmission associated with a grant depending on a signaled robustness level. A selection may, for example, be based on pre-defined rules or may be configured by the network (e.g., in RRC signaling). A selection may (e.g. also) be combined with other procedures, such as one or more described herein. In an example, a selection may, for example, be based on one or more of the following: (i) the physical resources being utilized for the uplink transmission (e.g., when the determination of the set of applicable resources for the transmission may itself be independent from such determination); (ii) a type of data being transmitted (e.g., when the selection of data may itself be independent from such determination); (iii) a current state of the WTRU (e.g., current power headroom); and/or (iv) a current state of the data (e.g., the TTL of the data).

In an example, a WTRU may determine a different value for parameters, for example, based on whether the robustness level indicates normal or reliable transmission. A WTRU may determine a different value for one or more parameters, such one or more of: (i) MCS; (ii) a set of applicable PRBs; (iii) applicable PRBs within a determined set of applicable PRBs; (iv) HARQ Process Type; (v) applicable procedure to generate and/or transmit (e.g., when DCI schedules DL transmission) or reception (e.g., when DCI schedules UL transmission) of HARQ feedback; (vi) power boosting and/or prioritization of power (e.g., when DCI schedules UL transmission) and/or (vii) applicable framing and/or frame structure (e.g., TTI duration). A WTRU may perform reception/transmission of data according to the determined set of parameters.

Systems, methods, and instrumentalities (e.g., aspects of entities, interfaces and procedures in a WTRU and/or network layers L1, L2, l3) have been disclosed for low latency MAC PDU assembly in wireless systems, such as 5gFLEX. Latency may be reduced, for example, by WTRU determination of network transmission parameters and signaling prior to a transmission grant. A WTRU may receive an MCS, resource range, etc. prior to a grant, e.g., for use in future grants. Data blocks may be incrementally created/encoded prior to a grant. Data units may be segmented, assembled and multiplexed, for example, based on data block sizes that allow MAC and RLC processing prior to a grant. Flexible grant sizes may be provided for early generation of transport blocks before a grant. A minimum guaranteed TBS may be signaled to permit early generation of a MAC PDU. Transmission parameters may be selected prior to a grant, for example, using blind decoding or a DCI reception procedure.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed is:

1. A method implemented by a wireless transmit/receive unit (WTRU), the method comprising:
   determining a first set of one or more transmission parameters and a second set of one or more transmission parameters, wherein the first set of one or more transmission parameters is associated with a first type of hybrid automatic repeat request (HARQ) feedback and the second set of one or more transmission parameters is associated with a second type of HARQ feedback;
   receiving a downlink control information (DCI) for a downlink transmission;
   determining whether to apply the first set of one or more transmission parameters or the second set of one or more transmission parameters based on the DCI; and
   transmitting one of the first type of HARQ feedback if the DCI indicates to apply the first set of one or more transmission parameters or the second type of HARQ feedback if the DCI indicates to apply the second set of one or more transmission parameters.

2. The method of claim 1, wherein the first set of one or more transmission parameters correspond to a first robustness level and the second set of one or more transmission parameters correspond to a second robustness level.

3. The method of claim 2, wherein the first robustness level corresponds to a normal robustness level and the second robustness level corresponds to a higher reliability robustness level.

4. The method of claim 1, wherein the first type of HARQ feedback corresponds to a first procedure used to generate HARQ feedback and the second type of HARQ feedback corresponds to a second procedure used to generate HARQ feedback.

5. The method of claim 1, wherein the first set of one or more transmission parameters corresponds to a specific type of transmission procedure for the first type of HARQ feedback and the second set of one or more transmission parameters corresponds to a specific type of transmission procedure for the second type of HARQ feedback.

6. The method of claim 1, wherein an explicit field in the DCI indicates whether to apply the first set of one or more transmission parameters or the second set of one or more transmission parameters.

7. The method of claim 1, wherein the WTRU determines whether to apply the first set of one or more transmission parameters or the second set of one or more transmission parameters based on at least a DCI format of the DCI.

8. The method of claim 1, further comprising receiving configuration information indicating rules for selecting whether to use the first set of transmission parameters or the second set of transmission parameters for one or more uplink transmissions.

9. The method of claim 8, wherein the configuration information is received in a radio resource control (RRC) message.

10. The method of claim 1, wherein the first set of one or more transmission parameters indicate one or more of a first modulation and coding scheme (MCS), a first set of one or more physical resource blocks (PRBs), or a first power level configuration.

11. A wireless transmit/receive unit (WTRU), the WTRU comprising a processor configured to:
    determine a first set of one or more transmission parameters and a second set of one or more transmission parameters, wherein the first set of one or more transmission parameters is associated with a first type of hybrid automatic repeat request (HARQ) feedback and the second set of one or more transmission parameters is associated with a second type of HARQ feedback;
    receive a downlink control information (DCI) for a downlink transmission;
    determine whether to apply the first set of one or more transmission parameters or the second set of one or more transmission parameters based on the DCI; and
    transmit one of the first type of HARQ feedback if the DCI indicates to apply the first set of one or more transmission parameters or the second type of HARQ feedback if the DCI indicates to apply the second set of one or more transmission parameters.

12. The WTRU of claim 11, wherein the first set of one or more transmission parameters correspond to a first robustness level and the second set of one or more transmission parameters correspond to a second robustness level.

13. The WTRU of claim 12, wherein the first robustness level corresponds to a normal robustness level and the second robustness level corresponds to a higher reliability robustness level.

14. The WTRU of claim 11, wherein the first type of HARQ feedback corresponds to a first procedure used to generate HARQ feedback and the second type of HARQ feedback corresponds to a second procedure used to generate HARQ feedback.

15. The WTRU of claim 11, wherein the first set of one or more transmission parameters corresponds to a specific type of transmission procedure for the first type of HARQ feedback and the second set of one or more transmission parameters corresponds to a specific type of transmission procedure for the second type of HARQ feedback.

16. The WTRU of claim 11, wherein an explicit field in the DCI indicates whether to apply the first set of one or more transmission parameters or the second set of one or more transmission parameters.

17. The WTRU of claim 11, wherein the WTRU determines whether to apply the first set of one or more transmission parameters or the second set of one or more transmission parameters based on at least a DCI format of the DCI.

18. The WTRU of claim 11, further comprising receiving configuration information indicating rules for selecting whether to use the first set of transmission parameters or the second set of transmission parameters for one or more uplink transmissions.

19. The WTRU of claim 18, wherein the configuration information is received in a radio resource control (RRC) message.

20. The WTRU of claim 11, wherein the first set of one or more transmission parameters indicate one or more of a first modulation and coding scheme (MCS), a first set of one or more physical resource blocks (PRBs), or a first power level configuration.

* * * * *